(12) United States Patent
Gale et al.

(10) Patent No.: US 10,158,389 B2
(45) Date of Patent: Dec. 18, 2018

(54) PROCESSING INTERFERENCE DUE TO NON-LINEAR PRODUCTS IN A WIRELESS NETWORK

(71) Applicant: AceAxis Limited, Harlow (GB)

(72) Inventors: Simon John Gale, Harlow (GB); David Damian Nicholas Bevan, Harlow (GB); Fiona Wilson, Harlow (GB); James Mark Naden, Harlow (GB)

(73) Assignee: ACEAXIS LIMITED, Harlow, Essex (GB)

( * ) Notice: Subject to any disclaimer, the term of this patent is extended or adjusted under 35 U.S.C. 154(b) by 0 days.

(21) Appl. No.: 15/632,016

(22) Filed: Jun. 23, 2017

(65) Prior Publication Data

US 2017/0294928 A1 Oct. 12, 2017

Related U.S. Application Data

(63) Continuation of application No. 14/723,323, filed on May 27, 2015, now Pat. No. 9,693,364, which is a
(Continued)

(30) Foreign Application Priority Data

Nov. 29, 2012 (GB) .................................. 1221528.1

(51) Int. Cl.
*H04B 1/10* (2006.01)
*H04B 10/2575* (2013.01)
(Continued)

(52) U.S. Cl.
CPC ......... *H04B 1/1027* (2013.01); *H04B 1/1036* (2013.01); *H04B 1/525* (2013.01);
(Continued)

(58) Field of Classification Search
CPC ............ H04B 1/1027; H04B 10/25753; H04B 1/109; H04B 1/1036; H04B 1/525; H04W 24/08; H04W 72/0453; H04W 72/082
See application file for complete search history.

(56) References Cited

U.S. PATENT DOCUMENTS 9,414,224 B1 * 8/2016 Schmidt ................ H04W 12/02
2001/0046867 A1 11/2001 Mizoguchi
(Continued)

FOREIGN PATENT DOCUMENTS

EP 2446598 A2 12/2010
WO 9929059 A1 6/1999
(Continued)

OTHER PUBLICATIONS

International Search Report and Written Opinion issued to related application PCT/GB2013/053176 dated Apr. 24, 2014.

*Primary Examiner* — Jenee Holland
(74) *Attorney, Agent, or Firm* — EIP US LLP

(57) ABSTRACT

A method of processing interference received in a wireless network, the interference comprising a non-linear product of at least one downlink signal of the wireless network, is provided. The method includes intercepting a plurality of optical links, each optical link being between a respective baseband processing unit of a plurality of baseband processing units and a respective radio head of a plurality of radio heads, to provide a plurality of downlink and uplink data streams. The method includes detecting interference in an uplink data stream representing signals received at a first uplink carrier frequency caused by non-linear products of at least a signal at a first downlink carrier frequency represented by a downlink data stream. The method includes generating an indication comprising information relating to
(Continued)

an uplink carrier frequency experiencing interference and at least one downlink carrier frequency causing interference.

20 Claims, 17 Drawing Sheets

Related U.S. Application Data continuation of application No. PCT/GB2013/053176, filed on Nov. 29, 2013.

(51) Int. Cl.
*H04B 1/525* (2015.01)
*H04W 72/04* (2009.01)
*H04W 72/08* (2009.01)
*H04W 24/08* (2009.01)
*H04B 7/0413* (2017.01)
*H04W 84/18* (2009.01)

(52) U.S. Cl.
CPC ...... *H04B 10/25753* (2013.01); *H04W 24/08* (2013.01); *H04W 72/0453* (2013.01); *H04W 72/082* (2013.01); *H04B 7/0413* (2013.01); *H04W 84/18* (2013.01)

(56) References Cited

U.S. PATENT DOCUMENTS

| | | | |
|---|---|---|---|
| 2002/0111163 A1 | 8/2002 | Hamabe | |
| 2003/0232600 A1* | 12/2003 | Montgomery | H01Q 1/246 455/67.11 |
| 2006/0292994 A1 | 12/2006 | Oura | |
| 2007/0274372 A1 | 11/2007 | Asai | |
| 2009/0023404 A1 | 1/2009 | Leinonen et al. | |
| 2009/0073902 A1* | 3/2009 | Astely | H04B 7/2656 370/280 |
| 2009/0086864 A1 | 4/2009 | Komninakis et al. | |
| 2010/0085061 A1* | 4/2010 | Bradley | H04B 17/0085 324/520 |
| 2011/0028086 A1* | 2/2011 | Avellan | H04B 7/18513 455/12.1 |
| 2011/0075754 A1* | 3/2011 | Smith | H04B 1/109 375/285 |
| 2011/0158211 A1 | 6/2011 | Gaal et al. | |
| 2011/0292846 A1* | 12/2011 | Hu | H04W 72/00 370/280 |
| 2012/0087334 A1 | 4/2012 | Suzuki | |
| 2012/0207038 A1* | 8/2012 | Choi | H04W 16/14 370/252 |
| 2012/0263047 A1 | 10/2012 | Love et al. | |
| 2012/0295558 A1 | 11/2012 | Wang et al. | |
| 2013/0003580 A1 | 1/2013 | Kovacs et al. | |
| 2013/0044621 A1* | 2/2013 | Jung | H04W 72/082 370/252 |
| 2013/0071112 A1* | 3/2013 | Melester | H04B 17/0085 398/38 |
| 2013/0122884 A1* | 5/2013 | Saito | H04W 16/18 455/418 |
| 2013/0194938 A1* | 8/2013 | Immonen | H04B 1/525 370/252 |
| 2013/0285877 A1* | 10/2013 | Desclos | H01Q 1/42 343/872 |
| 2014/0003270 A1* | 1/2014 | Maltsev | H04W 52/34 370/252 |
| 2014/0031006 A1* | 1/2014 | Moore | H04W 24/02 455/405 |
| 2014/0036736 A1* | 2/2014 | Wyville | H04B 1/109 370/278 |
| 2014/0086078 A1 | 3/2014 | Malladi | |
| 2014/0119197 A1* | 5/2014 | Maca | H04B 17/0085 370/241 |
| 2014/0133411 A1 | 5/2014 | Park et al. | |
| 2014/0370908 A1* | 12/2014 | Lee | H04L 5/0032 455/452.1 |
| 2015/0245365 A1* | 8/2015 | Isokangas | H04W 72/1226 455/423 |
| 2015/0257165 A1* | 9/2015 | Gale | H04B 1/1036 370/329 |
| 2016/0156422 A1* | 6/2016 | Lindoff | H04B 1/1036 370/252 |
| 2016/0301436 A1* | 10/2016 | Zou | H04B 1/525 |

FOREIGN PATENT DOCUMENTS

| | | |
|---|---|---|
| WO | 2012112112 A1 | 8/2012 |
| WO | 2013040579 A1 | 3/2013 |

\* cited by examiner $$(A\cos(a) + B\cos(b))^5 =$$

$$\frac{5}{8} A^5 \cos(a) + \frac{5}{16} A^5 \cos(2a-b) + \frac{5}{16} A^5 \cos(3a) + \frac{1}{16} A^5 \cos(5a) +$$

$$\frac{5}{16} A^4 B \cos(4a+b) + \frac{5}{16} A^4 B \cos(4a-b) + \frac{5}{4} A^4 B \cos(2a+b) +$$

$$\frac{15}{16} A^3 B^2 \cos(a+2b) + \frac{15}{8} A^3 B^2 \cos(a-2b) + \frac{5}{8} A^3 B^2 \cos(3a+2b) + \frac{15}{8} A^3 B^2 \cos(a) +$$

$$\frac{5}{8} A^3 B^2 \cos(3a) + \frac{15}{8} A^2 B^3 \cos(2a+b) + \frac{15}{8} A^2 B^3 \cos(2a-b) +$$

$$\frac{15}{4} A^2 B^3 \cos(2a+b) + \frac{5}{8} A^2 B^3 \cos(2a+3b) + \frac{5}{16} A B^4 \cos(a+4b) +$$

$$\frac{5}{16} A B^4 \cos(a) + \frac{5}{4} A^4 B \cos(b) + \frac{5}{16} A B^4 \cos(b) + \frac{15}{4} A^2 B^3 \cos(b) +$$

$$\frac{5}{8} A^2 B^3 \cos(3a) + \frac{5}{8} B^5 \cos(b) + \frac{5}{16} B^5 \cos(3b) + \frac{1}{16} B^5 \cos(5b)$$

$A = A_a(t); B = B_b(t) \rightarrow$ Amplitude Modulation (A.M.)

$a = 2\pi f_a t + \phi_a(t); b = 2\pi f_b t + \phi_b(t) \rightarrow$ carrier plus Phase Modulation (P.M.)

*FIG. 6*

$$(A\cos(a) + B\cos(b) + C\cos(c))^3 =$$

$$\begin{aligned}
&\tfrac{3}{4}A^3\cos(a) + \tfrac{1}{4}A^3\cos(3a) + \tfrac{3}{4}A^2B\cos(2a-b) + \tfrac{3}{4}A^2B\cos(2a+b) + \\
&\tfrac{3}{4}A^2C\cos(2a-c) + \tfrac{3}{4}A^2C\cos(2a+c) + \tfrac{3}{4}AB^2\cos(a-2b) + \\
&\tfrac{3}{4}AB^2\cos(a+2b) + \tfrac{3}{2}ABC\cos(a-b-c) + \tfrac{3}{2}ABC\cos(a-b+c) + \\
&\tfrac{3}{2}ABC\cos(a+b-c) + \tfrac{3}{2}ABC\cos(a+b+c) + \tfrac{3}{2}AB^2\cos(a) + \tfrac{3}{2}A^2B\cos(b) + \\
&\tfrac{3}{4}AC^2\cos(a-2c) + \tfrac{3}{4}AC^2\cos(a+2c) + \tfrac{3}{2}AC^2\cos(a) + \tfrac{3}{2}A^2C\cos(c) + \\
&\tfrac{3}{4}B^3\cos(b) + \tfrac{1}{4}B^3\cos(3b) + \tfrac{3}{4}B^2C\cos(2b-c) + \tfrac{3}{4}B^2C\cos(2b+c) + \\
&\tfrac{3}{4}BC^2\cos(b-2c) + \tfrac{3}{4}BC^2\cos(b+2c) + \tfrac{3}{2}BC^2\cos(b) + \tfrac{3}{2}B^2C\cos(c) + \\
&\tfrac{3}{4}C^3\cos(c) + \tfrac{1}{4}C^3\cos(3c)
\end{aligned}$$

$A = A_a(t)$; $B = B_b(t)$; $C = C_c(t) \rightarrow$ Amplitude Modulation (A.M.)

$a = 2\pi f_a t + \phi_a(t)$; $b = 2\pi f_b t + \phi_b(t)$; $c = 2\pi f_c t + \phi_c(t)$; $\rightarrow$ carrier plus Phase Modulation (P.M.)

FIG. 7

PROCESSING INTERFERENCE DUE TO NON-LINEAR PRODUCTS IN A WIRELESS NETWORK

CROSS-REFERENCE TO RELATED APPLICATIONS

This application is a continuation of U.S. patent application Ser. No. 14/723,323, filed May 27, 2015, which is a continuation of International Application No. PCT/GB2013/053176, filed Nov. 29, 2013, which claims priority to United Kingdom Patent Application No. GB 1221528.1, filed Nov. 29, 2012. Each of the above-referenced patent applications is incorporated by reference in its entirety.

BACKGROUND OF THE INVENTION

Field of the Invention

The present application relates generally to methods and apparatus for processing interference due to non-linear products of transmitted signals in a wireless network, and more specifically, but not exclusively, to detection and reduction of interference caused to a receiver due to passive intermodulation (PIM) products and/or passive harmonic (PH) products.

Description of the Related Technology

Non-linear products may be generated in a wireless system when a signal is transmitted along a signal path including a component having a non-linear transmission characteristic; these products typically differ in frequency from the signal or signals from which they were generated, and may potentially cause interference to other signals. The generation of non-linear products such as intermodulation products and harmonic products is becoming a problem of increasing importance in modern wireless communication systems, and in particular cellular wireless systems, since the radio frequency spectrum available has been steadily expanded as additional bands have become available, and the pattern of allocation of uplink and downlink bands within the available spectrum for use by various cellular systems, such systems using GERAN (GSM EDGE Radio Access Network), UTRAN (UMTS Terrestrial Radio Access Network) and E-UTRAN (Evolved UMTS Terrestrial Radio Access Network) radio access networks, and by various operators, is complex and territorially dependent. In this environment, and in particular at a cellular radio base station, it is likely that circumstances arise in which non-linear products generated from transmitted carriers in one or more downlink bands would fall within an uplink band in which signals are received at the base station. Non-linear products generated by non-linear characteristics of active components such as power amplifiers may generally be dealt with at a design stage by appropriate frequency management and filtering, but non-linear products caused by non-linear characteristics of passive components, so called passive intermodulation (PIM) products and/or passive harmonic (PH) products, may prove more difficult to manage. Many passive components may exhibit a non-linear transmission characteristic to some degree, for example due to an oxide layer at a metal to metal contact, and the non-linear characteristic may develop with time as an ageing process of the component. Furthermore, PIM or PH may be caused by components in the signal path between the transmitter and the receiver that are external to the transceiver equipment and which may be outside the operator's control, such as metallic objects on the antenna tower or other objects in the signal path through the propagation environment, such as fences; this is known as the "rusty bolt" effect.

Interference due to PIM or PH may reduce the carrier to interference ratio at a receiver, which may reduce coverage by a cell significantly. Conventionally, as a solution to the problem of suspected interference caused by PIM or PH in a cellular radio network, the source of the PIM or PH may be tracked down by field engineers and a component causing the PIM or PH may be replaced. However, this is labor intensive and relies on the problem being identified in order to alert the field engineers.

SUMMARY

According to a first aspect, a method of processing interference received in a wireless network, the interference comprising a non-linear product of at least one downlink signal of the wireless network, is provided. The method includes intercepting a plurality of optical links, each optical link being between a respective baseband processing unit of a plurality of baseband processing units and a respective radio head of a plurality of radio heads, to provide a plurality of downlink and uplink data streams. The method includes detecting interference in an uplink data stream representing signals received at a first uplink carrier frequency caused by non-linear products of at least a signal at a first downlink carrier frequency represented by a downlink data stream. The method includes generating an indication comprising information relating to an uplink carrier frequency experiencing interference and at least one downlink carrier frequency causing interference.

In some embodiments, the non-linear products are passive intermodulation (PIM) products. In some embodiments, the method further includes measuring power of PIM products in the detected interference. In some embodiments, the method further includes measuring relative power of PIM products between MIMO branches of the uplink data stream. In some embodiments, the method further includes determining, if the relative power of PIM products on one branch is higher on one MIMO branch than another MIMO branch, that a likely cause of PIM is damage to equipment on the branch with the higher relative power of PIM products. In some embodiments, the method further includes determining, if the relative power of PIM products on one branch is similar between MIMO branches, that a likely cause of PIM is external to the MIMO branches. In some embodiments, the method further includes measuring relative power of PIM products between bands in a multi-band antenna system. In some embodiments, the method further includes determining, if the relative power of PIM products on one band is similar to that on another band, that a likely cause of PIM is internal to an antenna or in an external environment. In some embodiments, the method further includes calculating the delay to a source of PIM. In some embodiments, the method further includes using the calculated delay to identify the position of a source of PIM.

According to a second aspect, an apparatus for processing interference received in a wireless network, the interference comprising a non-linear product of at least one downlink signal of the wireless network, is provided. The apparatus includes an interface configured to intercept a plurality of optical links, each optical link being between a respective baseband processing unit of a plurality of baseband processing units and a respective radio head of a plurality of radio heads, to provide a plurality of downlink and uplink data streams. The apparatus includes a detector element comprising a correlator configured to detect interference in an uplink data stream representing signals received at a first uplink carrier frequency caused by non-linear products of at least a signal at a first downlink carrier frequency represented by a downlink data stream. The apparatus includes a controller configured to generate an indication comprising information relating to an uplink carrier frequency experiencing interference and at least one downlink carrier frequency causing interference.

In some embodiments, the apparatus is arranged to intercept a plurality of CPRI optical links between associated base band processing units and radio heads at a cell site. In some embodiments, the apparatus is installed at a cell site. In some embodiments, the apparatus is installed at a base transceiver system hotel remote from a site where antennas are deployed. In some embodiments, the apparatus comprises a control element hosted in a network control element of an Operation and Support System/Network Management System (OSS/NMS) system. In some embodiments, the control element is configured to collect detection information from another apparatus for processing interference in the wireless network. In some embodiments, the control element is configured to diagnose and solve problems within the wireless network. In some embodiments, the control element is configured to correlate Key Performance Indications (KPIs) with other radio access networks (RANs). In some embodiments, the control element is part of a self-organizing network (SON). In some embodiments, the apparatus is configured to provide an indication that interference has been detected to a network management system.

Further features and advantages of the invention will be apparent from the following description of preferred embodiments, which are given by way of example only.

BRIEF DESCRIPTION OF THE DRAWINGS

FIG. 6 shows a mathematical expansion describing the generation of intermodulation products by an exponent 5 term in a non-linear transfer function in an embodiment;

FIG. 7 shows a mathematical expansion describing the generation of intermodulation products by mixing between three signals due to a power (exponent) 3 term in a non-linear transfer function in an embodiment;

DETAILED DESCRIPTION OF CERTAIN INVENTIVE EMBODIMENTS

By way of example, embodiments will now be described in the context of detection and reduction of interference caused by non-linear products, typically passive intermodulation (PIM) products and passive harmonic (PH) products, in cellular wireless networks such as GSM, 3G (UMTS) and LTE (Long Term Evolution) networks comprising GERAN, UTRAN and/or E-UTRAN radio access networks, but it will be understood that embodiments may relate to other types of radio access network, for example IEEE 802.16 WiMax systems, and that embodiments are not restricted to cellular wireless networks. Furthermore, embodiments may also relate to reduction of interference caused by intermodulation or harmonics in active components.

Figure 1:
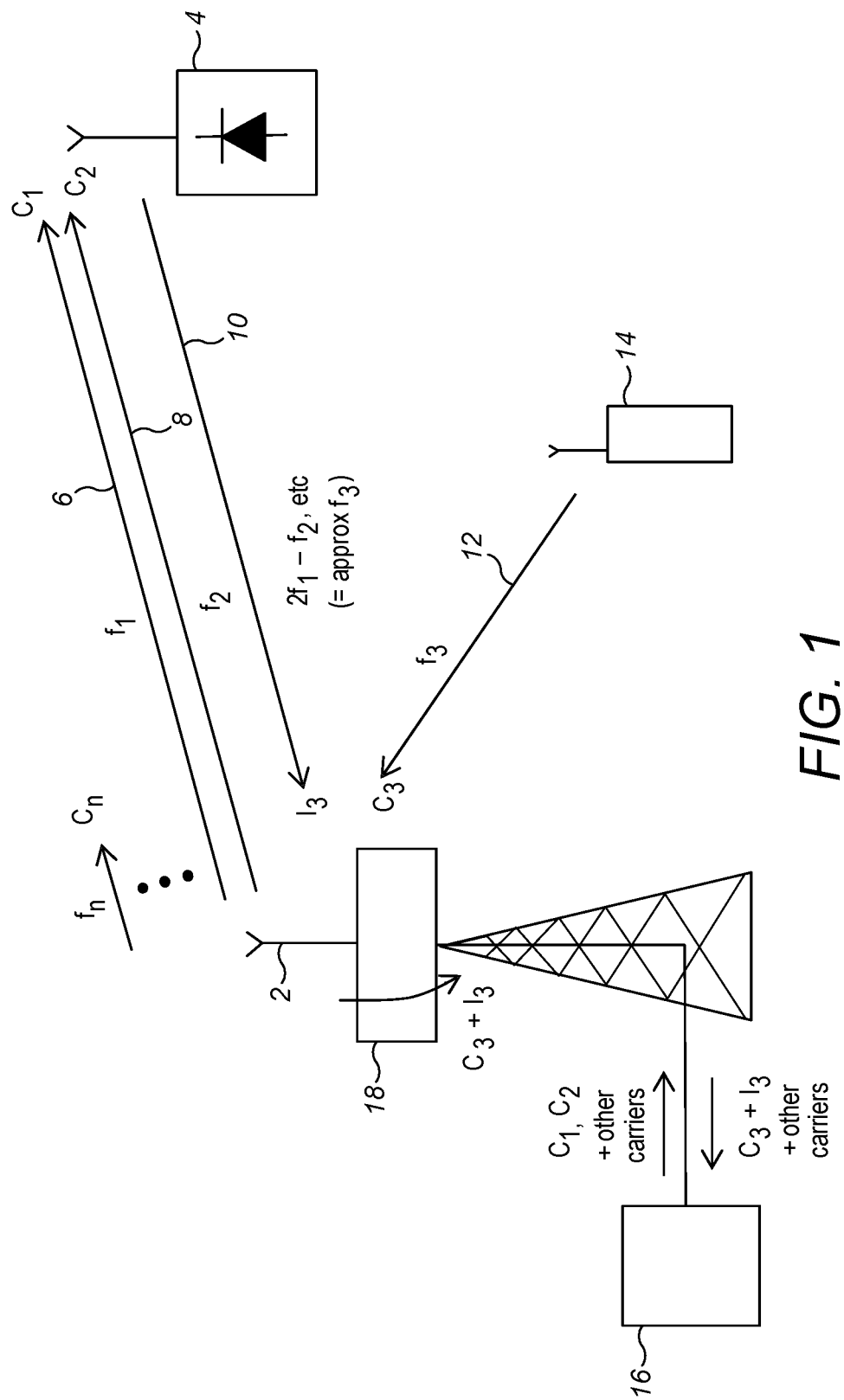
FIG. 1 is a is schematic diagram illustrating an example of interference caused by passive intermodulation.

FIG. 1 shows an example of interference to a received signal in a cellular wireless network. A first downlink signal $C_1$ and a second downlink signal $C_2$ are sent at baseband from a base station modem unit 16 to a Remote Radio Head (RRH) unit 18 as sample streams on a data link such as a Common Public Radio Interface (CPRI) or Open Base Station Architecture Initiative (OBSAI) data link. The data link typically carries both uplink and downlink CPRI data streams. The uplink and the downlink data streams typically each carry data representing many uplink and downlink signals; the signals $C_1$ and $C_2$ shown in FIG. 1 are typically a sub-set of many downlink signals carried in the downlink data stream, and the received uplink signal $C_3$ is typically a sub-set of many uplink signals carried in the uplink data stream. The base station modem unit may be referred to as a baseband unit, and is typically, although not necessarily, mounted in a cabinet on the ground. The Remote Radio Head comprises upconverter and downconverter units and is typically, but not necessarily, mounted on a tower at the base station next to the antenna 2 or antennas. The first and second signals $C_1$ and $C_2$ are upconverted to radio frequency and are transmitted at frequencies $f_1$ 6 and $f_2$ 8 respectively. In the example shown in FIG. 1, the first and second signals impinge upon a source of non-linear interference products such as passive intermodulation (PIM) 4, for example a metallic component having an oxide layer between metallic parts or comprising a ferromagnetic material. Intermodulation products of the first signal and the second signal are generated due to the non-linear response of the source of PIM 4. In addition, passive harmonic products of each of the first signal and the second signal may be generated.

Figure 2:
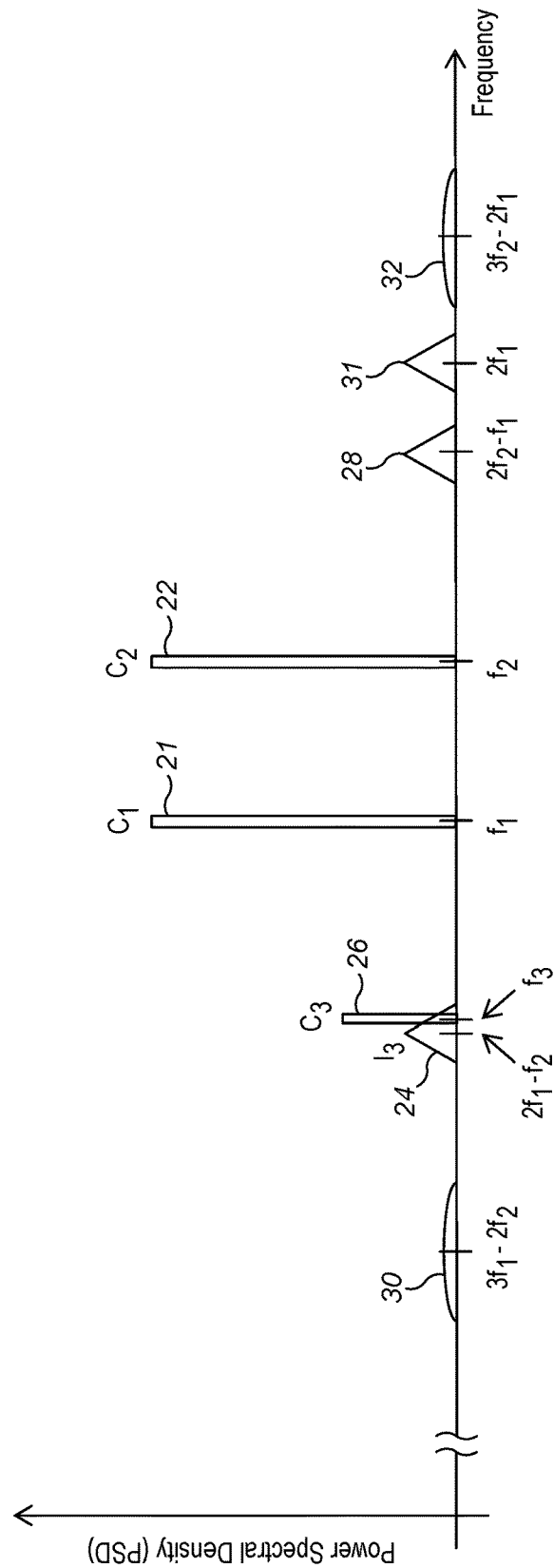
FIG. 2 is a schematic diagram illustrating intermodulation and passive harmonic products in the frequency domain.

FIG. 2 shows non-linear products in the frequency domain. It can be seen that the first signal 21 at frequency $f_1$ and the second signal 22 at frequency $f_2$ may produce, for example, third order products 26, 28 at frequencies $2f_1-f_2$ and $2f_2-f_1$, and fifth order products 30, 32 at frequencies $3f_1-2f_2$ and $3f_2-2f_1$. In addition, harmonic products of each of the first and second signal may be generated at integer multiples of the respective signal frequencies. For example, the second harmonic product 31 of the first signal is shown in FIG. 2. Other intermodulation and harmonic products (not shown) may also be generated.

In the case illustrated by FIG. 1 and FIG. 2, an uplink signal, i.e. a received signal $C_3$ 26 at frequency $f_3$, falls within the frequency spectrum occupied by the low side third order intermodulation products 24. It can be seen that there is typically an offset between the frequency of the received signal 26 and the center of the frequency spectrum occupied by the low side third order intermodulation products 24, since there is typically no reason to expect the frequencies to be equal. The intermodulation and harmonic products typically occupy a broader range of frequencies than the signals from which they are generated, and there may be more than one received signal falling within the spectrum occupied by the intermodulation and harmonic products.

Referring again to FIG. 1, it can be seen that intermodulation products $I_3$ of the first and second signals are transmitted 10 from the PIM source 4, in this example at $2f_1-f_2$. The intermodulation products $I_3$, in this example, fall at least in part, within a received uplink channel at $f_3$ and appear as interference to a received signal $C_3$ that is transmitted 12 at radio frequency from, for example, a user equipment 14 in communication with the base station. The received signal $C_3$ and the intermodulation products $I_3$ appearing as interference to the received signal are typically downconverted to baseband in the RRH 18 and sent on the data link to the baseband/modem unit 16.

Figure 3:
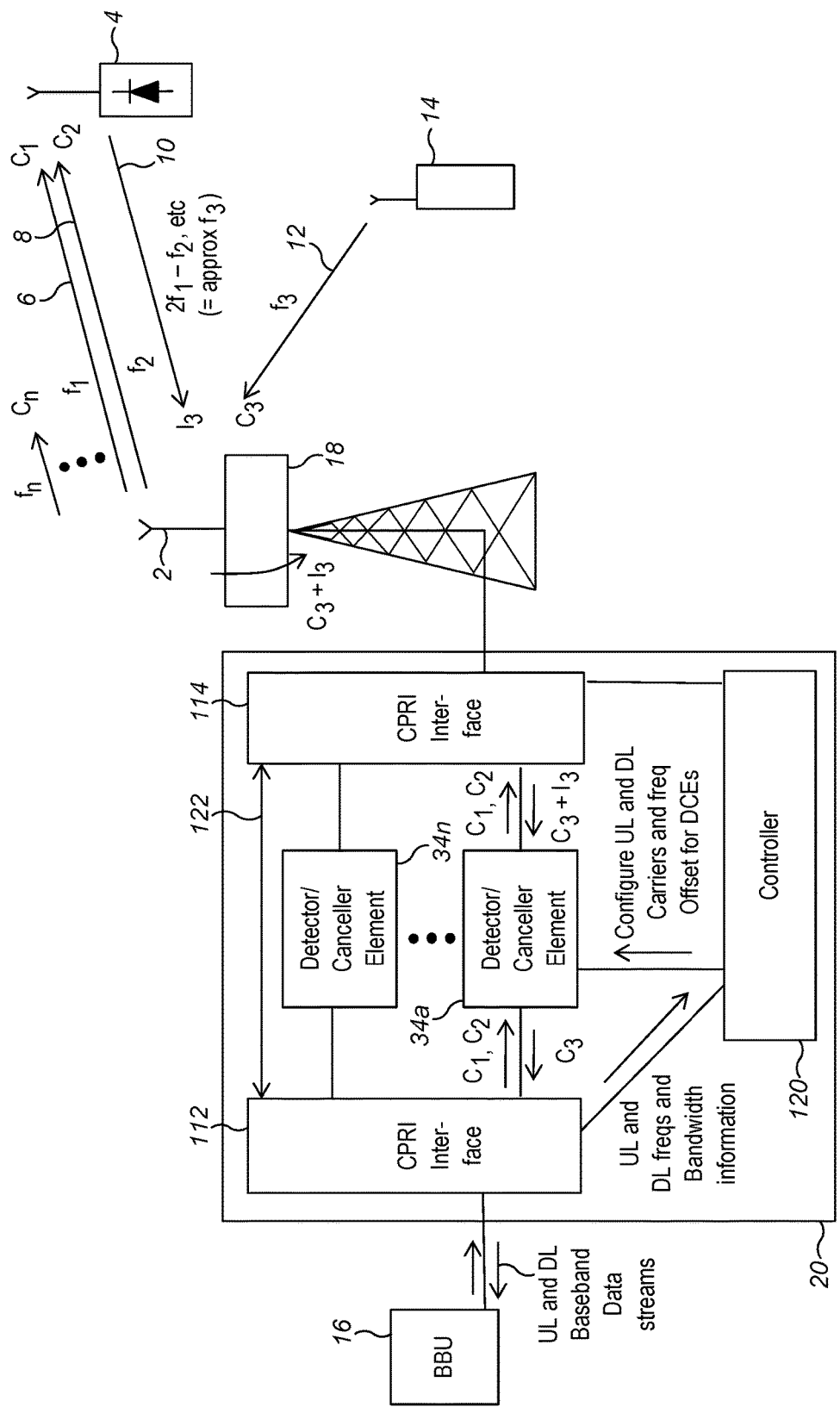
FIG. 3 is a schematic diagram illustrating reduction of interference caused by passive intermodulation, where the passive intermodulation is generated in an component external to the transmitter in an embodiment.

FIG. 3 shows an embodiment, in which interference to a received uplink channel is detected and reduced. Apparatus according to an embodiment 20, which may be referred to as a PIM/PH Site Manager, which comprises one or more detector elements, or as shown in FIG. 3, one or more combined detector/canceller elements 34a-34n, is inserted into one or more data links, typically the CPRI links, between a base station modem unit and a radio head unit. For example, the apparatus may be retro-fitted in an existing installation as an appliqué unit, by breaking into the existing data link or links and connecting the apparatus in series with the data link or links. In a typical arrangement, a separate data stream may be provided for each band of operation, and the downlink data streams may be up-converted for transmission at respective frequency bands, for example 3G and LTE bands, which are typically not contiguous. The up-converted signals may be combined using a diplexer and connected to a single antenna. The diplexer/antenna arrangement may be a source of non-linear products.

It can be seen from FIG. 3 that interference $I_3$ is processed, by being detected and cancelled, in a data stream carrying uplink signals received in a wireless network, the interference comprising a non-linear product of at least one downlink signal of the wireless network. In the case of PIM illustrated by FIG. 3, the PIM is a non-linear product of a first $C_1$ and second $C_2$ downlink signal, but in the case of PH, the non-linear product would be the product, for example the square, of a single downlink signal, for example $C_1$ or $C_2$.

The data stream carrying the plurality of uplink signals, including $C_3$, is received at a first CPRI interface 114 and at least a first data stream carrying a plurality of downlink signals is received at a second CPRI interface 112.

The designations $C_1$ and $C_2$ are used to designate the first and second signals irrespective of the carrier frequency. That is to say, the first signal may be designated as $C_1$ at radio frequency as transmitted by an antenna, but it is also designated as $C_1$ and referred to as the first signal at baseband, that is to say at zero or near zero intermediate frequency. Similarly, the term "received waveform" is used to refer to radio frequency, intermediate frequency or baseband representation of the received waveform, independently of carrier frequency. The received waveform may be in analogue or sampled data form.

A controller 120, which comprises a processor, selects from the data stream carrying the plurality of uplink signals, data representing signals $C_3$ received at a first uplink carrier frequency $f_3$. The controller also selects, from at least the first data stream carrying the plurality of downlink signals, data representing signals at at least a first downlink carrier frequency $C_1$.

A detector element, which may be a combined detector/canceller circuit element 34a, detects interference in the selected data representing signals received at the first uplink carrier frequency by correlation with a synthesized product generated from at least data representing signals $C_1$ at the first downlink carrier frequency $f_1$. This is typically a synthesized passive product. The signals may be received at an antenna, or for example, the term "received" may refer to receiving at a component in a radio receiver, such as a receiver amplifier. In the case of generation of synthesized PIM signals, the synthesized product can be generated also from data representing signals $C_2$ at the second downlink carrier frequency $f_2$. In this way, the detector element, or combined detector/canceller element, which is typically arranged to detect interference in a single signal received at an uplink carrier frequency, may be used to detect interference carried in a data stream representing many signals received at many respective uplink carrier frequencies. This can also allow more than one detector/combiner element (DCE) to be used to detect interference in signals carried in the uplink data stream, as shown in FIG. 3.

An uplink carrier frequency for use with a circuit element for detecting interference, such as a DCE, can be selected based on an assessment of which uplink frequencies may experience interference. Circuit elements may thus be used to detect interference at uplink carrier frequencies at which it is likely to occur, so that resources for detection of interference may be deployed efficiently and flexibly. This selection can be done by using information about the frequency of downlink signals and uplink signals that are active on the CPRI links to work out combinations of active downlink frequencies that could potentially cause interference to active uplink channels. DCEs can then be allocated to the combinations of downlink and active frequencies that may be expected to be an interference risk.

So, selecting of data representing signals received at a first uplink carrier frequency may comprise processing information identifying several downlink carrier frequencies of downlink signals and information identifying several uplink carrier frequencies of uplink signals. Potential interference frequencies may be determined at which a non-linear product of at least one downlink signal may be generated. Then, from uplink carrier frequency information, a first uplink carrier frequency may be found that may experience interference from at least one of the plurality of potential interference frequencies. A DCE may be allocated to operate using data received at this first uplink frequency.

Regarding the selection of downlink frequencies for use at the DCE, data representing signals received at a first downlink carrier frequency is selected by selecting data representing signals at least a first downlink carrier frequency which has been determined to produce at least a first non-linear product that may interfere with the first uplink carrier frequency, so that the downlink data likely to produce interference at the first uplink frequency may be selected for use in generating the synthesized products, such as synthesized PIM or PH, that are correlated with received signals to detect interference on the basis of the correlation.

The selection of an uplink channel likely to experience interference may take account of the respective bandwidths of uplink signals potentially experiencing interference and downlink signals potentially generating non-linear interference such as PIM and PH. In particular, the bandwidth of non-linear interference produced may depend on of the order of the interference. So, for example, $5^{th}$ order (exponent 5) interference may be broader in bandwidth than $3^{rd}$ order (exponent 3) interference, and thus may cause interference to more uplink channels.

So, an uplink carrier frequency that is at risk of experiencing interference from at least one of the potential interference frequencies may be determined by determining a bandwidth, that is to say range of frequencies, of a non-linear product based on at least the bandwidth of the signals at the first downlink carrier frequency and an order of the non-linear product, by processing information relating to a bandwidth of signals received at the first uplink carrier frequency, and by determining a degree of overlap between a band defined by the bandwidth of the first non-linear product and a band defined by the bandwidth of the signals received at the first uplink carrier frequency.

Information identifying the frequencies for use in calculating which uplink channels may experience interference, and which downlink channels may cause the interference, may be conveniently obtained from the data streams carrying the downlink and/or uplink signals. The data streams are typically carried on CPRI or OBSAI data links, typically carried on fibers running between a base band unit (BBU) and a remote radio head (RRH). This avoids the need to provide another channel for obtaining the information. In an alternative embodiment, the frequency information may be received from a network management system.

A detector element comprising a correlator, such as a DCE, may be configured, as shown in FIG. 3, to accept the selected data $C_3$ representing signals received at the first uplink carrier frequency $f_3$. The DCE, as already mentioned, generates a synthesized product from at least data representing signals $C_1$ at the first downlink carrier frequency. The DCE then correlates the accepted data with the synthesized product to form data representing a correlation and detects interference in the selected data on the basis of the data representing the correlation. This process is described in more detail in connection with FIG. 4. The configuration of the DCE is on the basis of a determination of an uplink carrier frequency that may experience interference from at least one of the potential interference frequencies. So, the DCE may be used efficiently, so that it will operate on an uplink channel at which interference is expected and generate a synthesized product for use in detecting the interference on the basis of one or more downlink channels which are expected to cause non-linear interference that may affect the uplink channel.

As shown in FIG. 3, a detector element, in this example a DCE, may be allocated from a pool of available detector elements $34a$-$34n$ for use in detecting interference in the selected data, so that several detector elements may be used efficiently by allocating them to uplink channels likely to experience interference. The allocated detector element may be returned to the pool of available detector elements if interference is not detected in the selected data. So, if interference is not detected by a detector element at a given uplink frequency, the detector element may be allocated to another uplink frequency, and so measurements may be made at more uplink frequencies than there are detectors if required. The DCE may be used to reduce interference in addition to detecting interference in the selected data.

In an embodiment, a method of cancellation of non-linear products consists of the following steps. Firstly, generating a synthesized local replica of a non-linear product based on knowledge of the transmitted signal. Secondly, determining the exact phase, amplitude, delay and/or frequency offset of the non-linear product as it appears in the uplink receive path by cross-correlating the aggregate uplink signal with the local replica. Thirdly, scaling, delaying and frequency shifting, if necessary, the local replica non-linear product and adding it to the aggregate uplink signal in antiphase to cancel the actual non-linear product.

So, interference may be reduced in the selected data representing signals received at the first uplink carrier frequency by combining the synthesized product with the selected data. So, interference may be reduced, by combining with the synthesized product to at least partially cancel the received non-linear interference, such as PIM or HM. The operation of a receiver arranged to receive the signal in which the interference has been cancelled may thus be improved. Potentially the capacity and/or coverage of a cellular wireless system may be improved by the cancellation of non-linear products. A frequency offset is determined between the first uplink carrier frequency and a potential interference frequency. The synthesized product may combined with the selected data by a process comprising offsetting a non-linear product in frequency in dependence on the frequency offset. In this way, the synthesized product may be generated at baseband from one or more baseband representations of downlink signals, as typically carried by the downlink data stream or streams, typically by generating a baseband non-linear product by a multiplication process applied to data from one or more data streams, and then the baseband non-linear product may be offset in frequency to produce the synthesized product. Alternatively, the uplink signal represented by the selected data may be offset in frequency.

The reduction of interference may thus be carried out by the following process. A canceller element such as a DCE may be configured to accept the selected data representing signals received at the first uplink carrier frequency $f_3$, to generate a synthesized product from at least data representing signals at a selected downlink carrier frequency $f_1$, to correlate the accepted data with the synthesized product to form data representing a correlation, and to reduce interference in the selected data on the basis of the data representing the correlation. This configuration is on the basis of detecting of interference in the data representing signals received at the first uplink carrier frequency.

As illustrated in FIG. 3, a canceller element, which may be a DCE, may be allocated from a pool of available canceller elements 34a-34n for use as the first canceller element. The canceller element may be allocated to an uplink channel on the basis of detection of interference in that channel.

Figure 4:
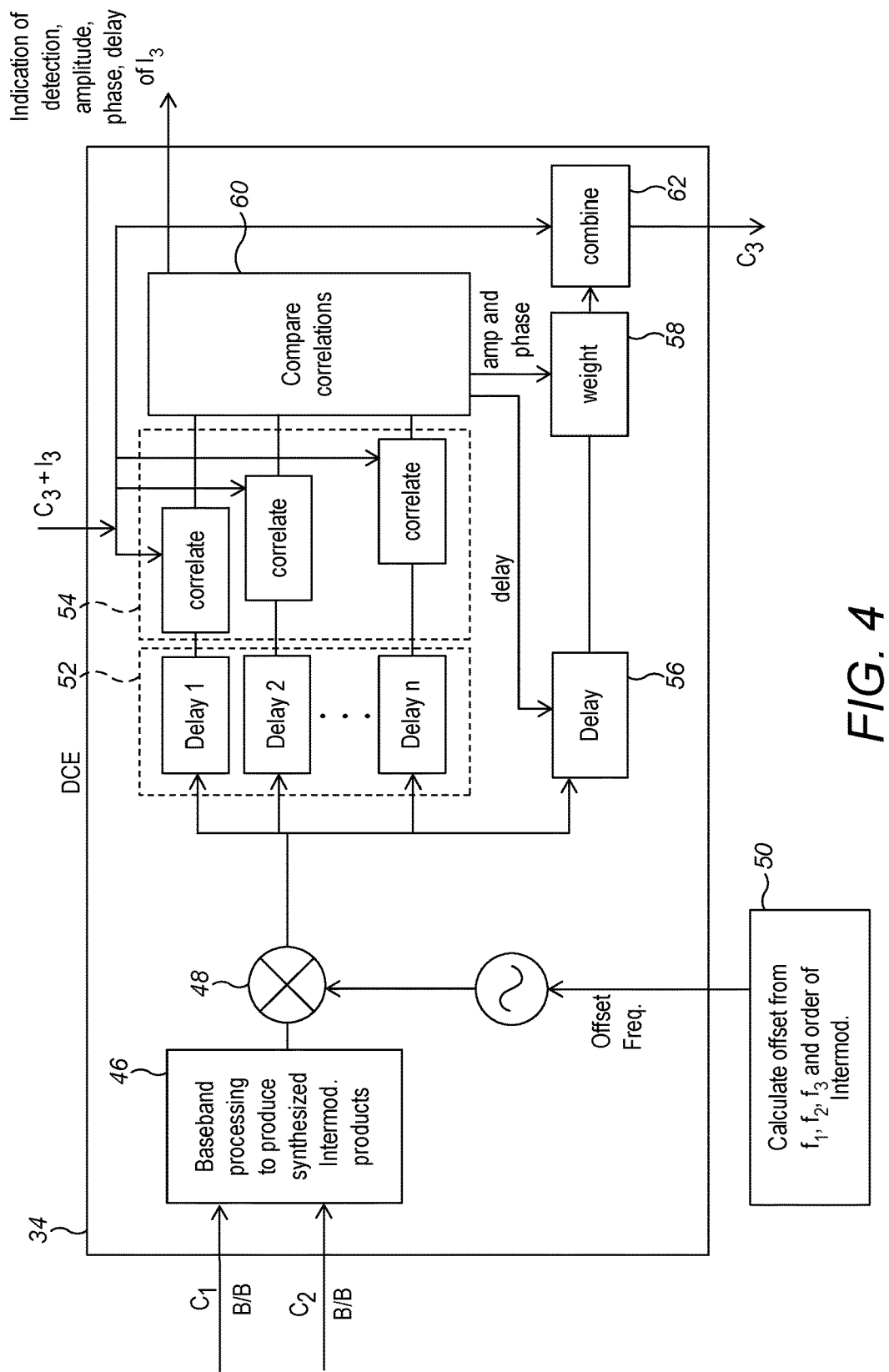
FIG. 4 is schematic diagram showing apparatus including a Detector/Canceller Element (DCE) for detection and reduction of interference on a single channel caused by intermodulation products in an embodiment.

FIG. 4 shows the DCE 34 in more detail, showing an embodiment as an example of an arrangement for reduction of interference to a received signal on a single receive channel caused by intermodulation products of at least the first signal and the second signal, the first and second signals being downlink signals. The first and second signals $C_1$ and $C_2$, as shown in FIG. 3, are received at baseband at the apparatus, for example from the data link from the base station modem unit. The DCE may select the first signal $C_1$ and the second signal $C_2$ on the basis of a determination of which downlink signal frequencies may produce intermodulation products that may fall within a channel of interest that carries the received signal, based on well-known relationships between signal frequencies and the frequencies of intermodulation products produced from those frequencies. On the basis of this determination, the appropriate first and second downlink signals C1 and C2 may be selected for generation of synthesized intermodulation products. On the basis of the first signal and the second signal, synthesized intermodulation products are generated 46. In the case of generating synthesized harmonic products, this would be on the basis of the first or second signal. The intermodulation product or products that are generated may be selected on the basis of which intermodulation products would be expected to fall in the channel of interest. In the embodiment shown, the synthesized intermodulation products are delayed 52 by a plurality of delay values (Delay 1 . . . Delay n) to generate a plurality of delayed interference signals comprising synthesized interference products. In other embodiments, a plurality of delays may be used to generate the plurality of delayed interference signals by applying delays to one or both of the first and second signals before synthesized intermodulation products are generated. The plurality of delays may have, for example, a range of values greater than 100 ns, and a range values greater than 200 ns may be advantageous, since the source of intermodulation products may be outside the transmitter or receiver in an unknown location. In embodiments in which the relative delay between the synthesized intermodulation or harmonic product is known, a pre-determined delay value may be used, rather than a plurality of delay values.

The received signal $C_3$ having interference comprising intermodulation products $I_3$ of at least the first signal and the second signal is received at the DCE, for example from the uplink data link at baseband as shown in FIG. 4 as $C_3+I_3$. In this embodiment, each of the delayed interference signals is correlated with the received signal to produce a data representing a correlation 54 for each delayed interference signal. The data representing a correlation may be, for example, the magnitude of the correlation. Then, at least one delay value is selected from the plurality of delay values in dependence on the data representative of the correlations; for example, the delay value may be selected that resulted in the greatest correlation magnitude. The selected at least one delay value is passed to a delay block 56 and is used to generate an interference signal comprising synthesized intermodulation products generated from the first signal and the second signal. In the embodiment shown in FIG. 4, the interference signal comprising synthesized intermodulation products is generated by a process involving delaying synthesized interference products produced at baseband in block 46 by the selected delay value. The generated interference signal is then combined with the received signal. The combination is preferably in antiphase, that is to say a subtraction, so that the interference in the received signal is cancelled or reduced. The combination process may comprise weighting the interference signal, for example in amplitude and phase according to amplitude and phase values derived from data representing the correlation as shown in FIG. 4 at block 58, and combining the weighted interference signal with the received signal, as shown at block 62. As shown in FIG. 4, the received signal $C_3$ may be output from the DCE with the interference cancelled or reduced, for example on the data link to the modem unit.

In an alternative to the embodiment shown in FIG. 4, the production of synthesized intermodulation products may be carried out separately for a first application of generating the plurality of delay values for the purposes of generating a correlations and for a second application of generating synthesized interference products for the purposes of combining with the received signal to reduce or cancel the interference. The first application does not need to be carried out in real time, since selecting a delay value can be a background activity which may involve a periodic update of delay value. The second application is preferably carried out in real time, so that synthesized interference products can be generated at a sufficient rate that interference can be effectively cancelled or reduced.

The delay values from which a delay value is selected may be arranged to cover an expected range of delay values. For example, the range of delay values may be round trip delay values from a source of the first and/or second signals via a source of intermodulation products to the apparatus. The delay values may be relative to the delay value of a direct path from the source of the first and/or second signals to the apparatus, the direct path being used to provide samples of the first and second signals at the apparatus. The source of the intermodulation products may be a source of passive intermodulation (PIM), which may be in the transmitter equipment, in the receiver equipment, or outside the transmitter or receiver in the propagation path at a typically unknown location, so that a wide range of delay values may be possible.

The processing of the first signal and the second signal at baseband to produce baseband intermodulation products may be carried out as follows. Considering, for example, generation of third order intermodulation products of two signals, having amplitude modulation A and B respectively, and a phase comprising carrier phase and phase modulation a and b respectively. Products due to a non-linearity with exponent 3 are given by:

$$(A\cos(a)+B\cos(b))^3$$

which may be expanded to give:

$$\frac{1}{4}(3A^3\cos(a) + A^3\cos(3a) + 3A^2B\cos(2a-b) + \\ 3A^2B\cos(2a+b) + 3AB^2\cos(a-2b) + 3AB^2\cos(a+2b) + \\ 6AB^2\cos(a) + 6A^2B\cos(b) + 3B^3\cos(b) + B^3\cos(3b))$$

The terms of the expansion which are of interest, in that they may fall in an uplink receive band, are the terms $3A^2B \cos(2a\text{-}b)$, which represents the lower third order product as shown in FIG. 2 as $I_3$ as indicated by reference numeral 24, and $3AB^2 \cos(a\text{-}2b)$, which may also be written as $3AB^2 \cos(2b\text{-}a)$, which represents the upper third order product as shown as indicated in FIG. 2 by reference numeral 28. Products which appear at the fundamental frequencies, and at or around the third harmonics, need not be generated as baseband intermodulation products in the PIM canceller, since they may be filtered out at a victim receiver. Which of the 'upper' or 'lower' products falls in an uplink receive band will depend upon whether the uplink band is allocated above or below the downlink band. The mathematics above shows that the intermodulation products contain amplitude and phase modulation which is a function of modulation of the first and second signals which generated the intermodulation products, and that baseband intermodulation products may be generated in the PIM canceller from the knowledge of the amplitude and phase of the first and second signals; this information is available in a baseband representation of the first and second signals. A similar process may be applied for the generation of harmonic products at baseband, by generating square and cubic terms, etc., of A cos(a) and/or B cos (b), to represent respective harmonic terms.

However, it may be necessary to frequency shift the intermodulation or harmonic products generated at baseband to produce the synthesized non-linear products suitable for cancelling interference in the received signal, so that synthesized non-linear products are aligned in frequency with the non-linear products in the interference to the received signal. This is because, as shown in FIG. 2, the center frequency of the non-linear products interfering with the received signal may not correspond with the center frequency of the received uplink channel of the received signal, but may be offset by an offset frequency.

FIG. 4 shows frequency shifting of the baseband non-linear products, as represented by mixing function 48 and offset frequency calculation function 50. The frequency shifting comprises shifting by a frequency determined by at least a frequency of a channel in which the received signal is received, a frequency of the first radio frequency signal, and a frequency of the second radio frequency signal.

There may also be a need, in some embodiments, to adjust the frequency of the frequency shift by a correction factor, which may be a correction, also known as a fine frequency adjustment, applied in addition to the frequency shift determined by calculation from knowledge of the frequency of a channel in which the received signal is received, the frequency of the first radio frequency signal, and the frequency of the second radio frequency signal. The frequency shifting may comprise shifting by a frequency determined by adjusting the frequency shift to a plurality of frequency shift values and selecting a frequency for the frequency shifting shift on the basis of data representing a correlation of a delayed interference signal with the received signal for each of the plurality of frequency shift values. So, for example, the frequency shift may be selected that gives the largest correlation magnitude. In this way, a frequency shift value may be adjusted to remove an unknown component to the offset between the frequency of the channel in which the received signal is received and the frequency of the non-linear products in the interference to the received signal. The unknown component to the frequency offset may, for example, be caused if the precise frequency relationship between frequencies used to upconvert the first and/or second signals and the frequency used to downconvert the received signal is not known.

Figure 5:
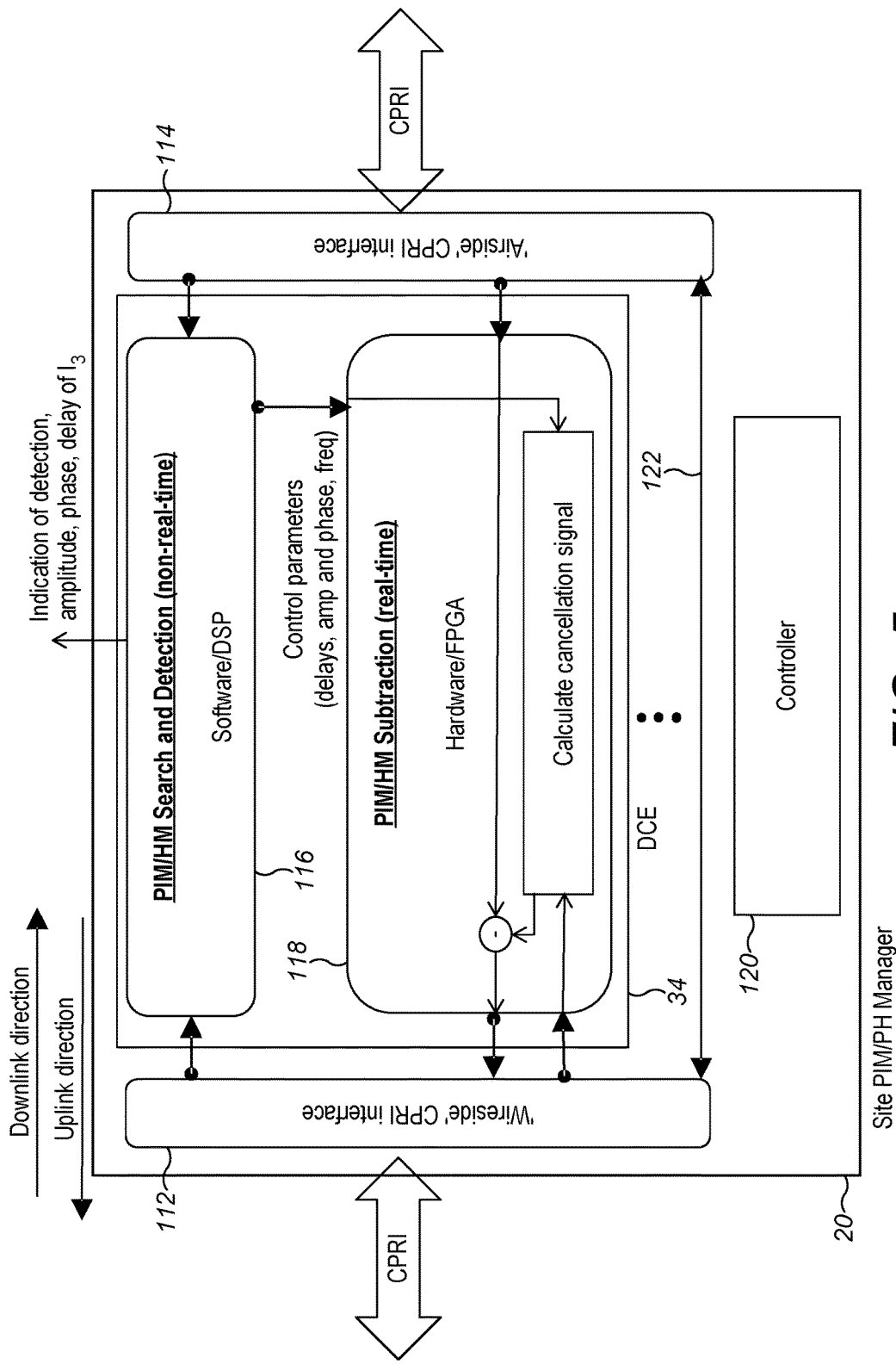
FIG. 5 is a schematic diagram showing a Site PIM Manager comprising a first processor part and a second processor part in an embodiment.

FIG. 5 is a schematic diagram showing apparatus 20 according to an embodiment, which may be a Site PIM/PH Manager, arranged with a first processing part 116 and a second processing part 118. The first and second processing parts may be implemented using different technology.

The first processing part may be arranged to perform what may be termed PIM/PH search and detection functions, which need not be performed in real time, and may be performed with software running on a digital signal processor. The second processor part may be arranged to perform what may be termed PIM/PH calculation and subtraction functions, which need to be performed in real time, and which may be implemented as a hardware gate array, such as a Field Programmable Gate Array.

For example, the first processing part may be arranged to correlate each of the delayed interference signals with the received signal to produce data representing a correlation for each delayed interference signal, and to select at least one delay value in dependence on a comparison of the data representative of the correlations. The second processing part may be arranged to combine, with the received signal, the interference signal comprising synthesized non-linear products generated from the first signal and the second signal using the at least one delay value. In this way, the apparatus may be implemented efficiently, by using a type of technology appropriate to each processing part.

As shown in FIG. 5, the first processing part may be arranged to generate and send an indicator of the at least one selected delay value to the second processing part. Typically, the first processing part comprises a processor and memory, which are arranged to execute software instructions to generate the indicator. Also, the first processing part may generate and send values of amplitude, phase and frequency to the second processing part, for use in generating the synthesized non-linear products.

The second processing part may be arranged to generate synthesized non-linear products at baseband from the first signal and the second signal using the at least one delay value indicated by the indicator, at a sampling rate of at least the sampling rate of the received signal. As a result, the second processing part may process data in real time, so that interference in the received signal may be continuously reduced or cancelled in real time, without introducing undue delay into the receive path for the uplink.

As shown in FIG. 5, the apparatus comprises a first interface 112, typically a CPRI interface, for connection to the base station modem unit and a second interface 114, also typically a CPRI interface, for connection to the radio head unit, the first interface being arranged to receive downlink data representing at least the first signal and the second interface being arranged to receive uplink data representing at least the received signal. The first interface is also arranged to output modified uplink data representing at least the received signal in which the received signal is combined with the interference signal comprising synthesized non-linear products generated from the first signal and the second signal.

In embodiments, the delay value that is selected in dependence on data representative of the correlation may be a delay value that is applied to synthesized intermodulation products generated from the first and second signal to form the delayed interference signals, that is to say the delay is applied after the synthesized intermodulation products are generated. Alternatively, the delay value that is selected in dependence on data representative of the correlation may be a delay value that is a value of a delay applied to the first signal to form the delayed interference signals, and/or the delay value may be a value of a delay applied to the second signal to form the delayed interference signals. The delay value applied to the first signal may be different from the delay value applied to the second signal, for example where the delay from the first and second signals to the source of intermodulation products is different, for example where the first and second signals are transmitted from different antennas and the delay of each to an external PIM source is different.

In embodiments, an equalizer may be substituted for some or all of the variable delay blocks, and the settings of the equalizer may be selected on the basis of the data representative of the correlations for trial values of the equalizer settings, in a similar manner to the selection of the at least one delay value. An equalizer may have a variation of delay across its pass band in a controllable fashion, and may be used to correct for a distortion to the first or second signal in the transmission path to the source of intermodulation products, or for distortion to the interference signal.

The generation of synthesized intermodulation products was described in connection with FIG. 4 in terms of the generation of third order terms at baseband in order to cancel intermodulation products generated by cube terms in the transfer characteristic of a non-linear device. However, in addition to the generation of third order intermodulation products by cube terms in a device transfer function, intermodulation products may also be generated at the frequencies expected for third order products, such as $2f_1-f_2$ and $2f_2-f_1$, by terms in a device transfer function of powers 5,7,9, and potentially by any odd power device nonlinearities, where the power is at least as great as the power of the respective term of the device transfer function. Correspondingly, intermodulation products normally termed as 'fifth order' can actually be generated by device nonlinearities of powers 5,7,9, . . . and all higher odd power device nonlinearities. The pattern continues in this way for all higher (odd) order intermodulation products (i.e. 'seventh', 'ninth' etc.), which can be generated not only by device nonlinearities of the same power, but also by device nonlinearities of higher odd powers.

FIG. 6 shows a mathematical expansion illustrating the generation of intermodulation products by a power (exponent) 5 term in a device transfer function. The terms within broken lines have been highlighted as terms that may typically fall within a receive band in some arrangements of cellular radio uplink and downlink frequencies. In particular, the terms include $\cos(2a-b)$, and $\cos(a-2b)$, which correspond to the frequencies $2f_1-f_2$ and $2f_2-f_1$. Therefore, it may be seen that knowledge of (or guessing of) the mechanism for generating intermodulation products may be used to generate corresponding synthesized intermodulation products.

FIG. 7 is an example of a mathematical expansion showing the generation of intermodulation products of three signals by a cubic term of a non-linear device characteristic. The terms within broken lines have been highlighted as terms that may typically fall within a receive band in some arrangements of cellular radio uplink and downlink frequencies.

So, embodiments have been described in which a search is carried out for delay, frequency and/or amplitude values, and choosing the combination of values of the various parameters in dependence on data representing the correlation value, typically the combination that produces the greatest magnitude. Similarly, referring to FIG. 4, a search is carried out for the values of delay in functional block 52, and/or frequency offset in block 50 in dependence on data representing the correlation, typically selecting the combination of values that maximizes the correlation. The presence of a correlation peak indicates that intermodulation products have been detected, and detection of intermodulation products may be indicated if the data representing the correlation exceeds a predetermined threshold. Combination of synthesized intermodulation products with the received signal may be dependent on the detection of intermodulation products. Alternatively, the amplitude of the weight value 58 in FIG. 4 may be automatically set to a small value when the magnitude of the correlation is small. The process of searching over multiple hypotheses about signal delays, amplitudes and phases may be arranged as a series of successive stages. For example, the search process may be split into the following sub-processes. Initially, a coarse acquisition process may be employed, whereby approximate phases, amplitudes, delays and/or frequencies are found by searching over many possibilities with relatively large steps and a relatively large search range. Following this, a finer acquisition process may be employed, using finer steps, focused more tightly around the values found by the coarse acquisition process. Then, a tracking mode may be employed, whereby the best solution is updated slowly in time, using an 'early-late-gate' approach, that is to say testing alternative hypothesis either side of the current best hypothesis, to track changes in parameters. This may reduce processor loading in comparison with the coarse and fine acquisition phases. As has been described, in embodiments, knowledge of the mathematics describing how the PIM is originally generated in the PIM source nonlinearity is used to generate a local replica of the PIM, that is to say synthesized intermodulation products, which is used to cancel the actual PIM in the received signal by adding it in antiphase. The mathematics shows that the PIM signal is a deterministic function of the input signals, i.e. downlink transmissions, and is independent (apart from a frequency shift) of the frequency separation between those input signals. For different PIM-generating sources, the form of the signal from each exponent of nonlinearity is the same, apart from some arbitrary amplitude/ phase scaling, assuming that the relative delays between different PIM sources are small compared to the correlation time of the signal. However, the relative power levels of the different intermodulation products might be different. A search may be carried out over different relative powers, and a combination of values may be selected that produces the greatest magnitude of correlation between the synthesized intermodulation products and the intermodulation products in interference to the received signal.

Figure 8:
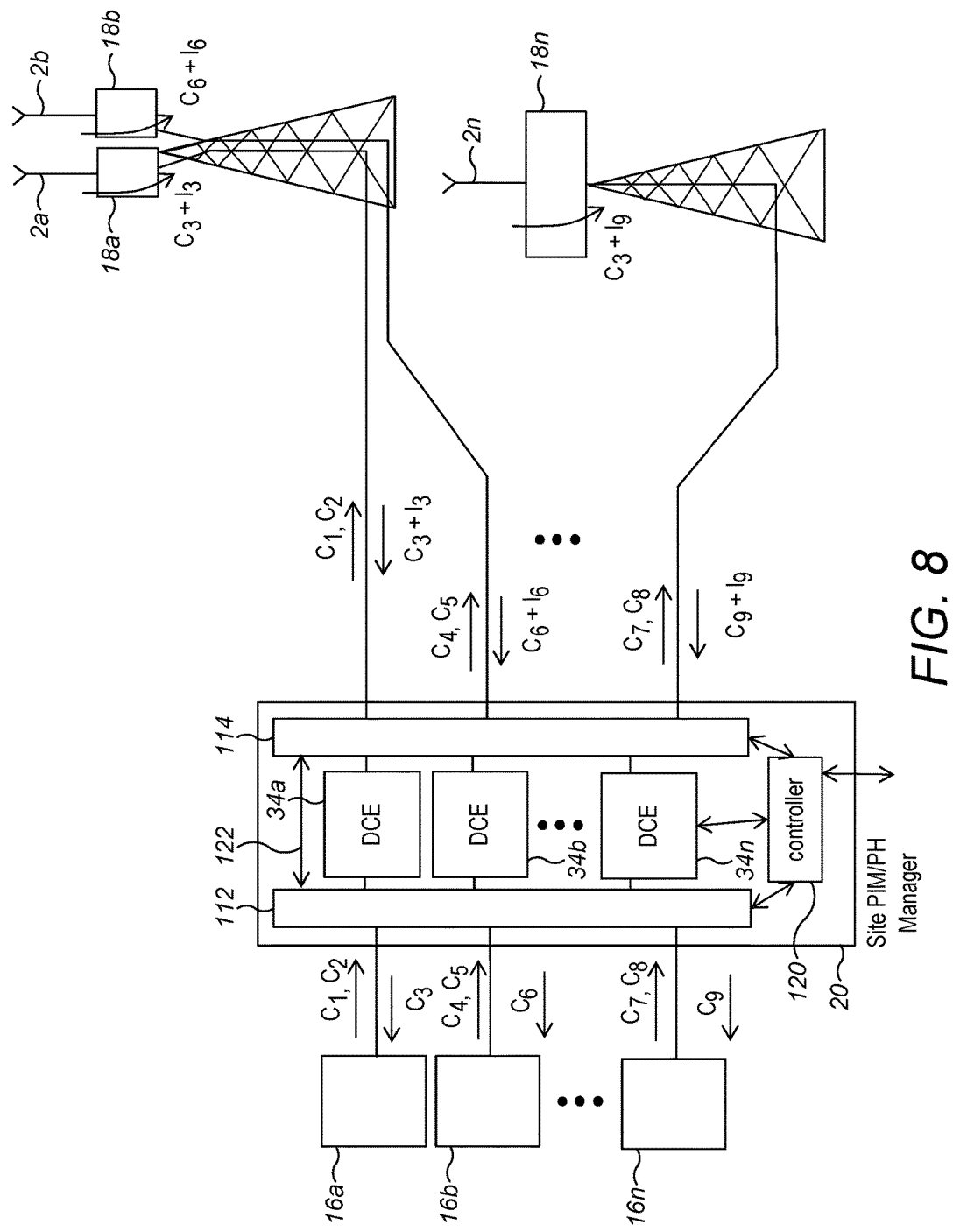
FIG. 8 is schematic diagram showing apparatus including a Site PIM/PH Manager for reduction of interference on a plurality of data streams caused by non-linear products in an embodiment.

FIG. 8 is schematic diagram showing apparatus including a Site PIM/PH Manager in a system with multiple data streams such a CPRI streams.

The first downlink carrier frequency $f_1$ of signal $C_1$ may be within a first transmission band and the second downlink carrier frequency $f_2$ of signal $C_2$ may be within a second transmission band, the second transmission band being not contiguous with the first transmission band. For example, $C_1$ may be within a 3G band and $C_2$ may be within a LTE band. In this case $C_1$ and $C_2$ may be carried on separate data streams, but may be transmitted from a single antenna. So, data representing signals at the first downlink carrier frequency may be received from the first downlink data stream, and data representing signals at the second downlink carrier frequency may be received from a second downlink data stream. The first downlink data stream may be carried by a first optical fiber, and the second downlink data stream may be carried by a second optical fiber, different from the first optical fiber.

Alternatively, the first downlink data stream may be a data stream for a first antenna 2a, and the second downlink data stream may be a data stream for a second antenna 2n, the second antenna being at a different base transceiver station than is the first antenna, as shown in FIG. 8.

The wireless network may be a cellular wireless network comprising a plurality of Radio Access Networks (RANs).

The data stream carrying the plurality of uplink signals and at least the first data stream carrying the plurality of downlink signals are CPRI or OBSAI data links.

Figure 9:
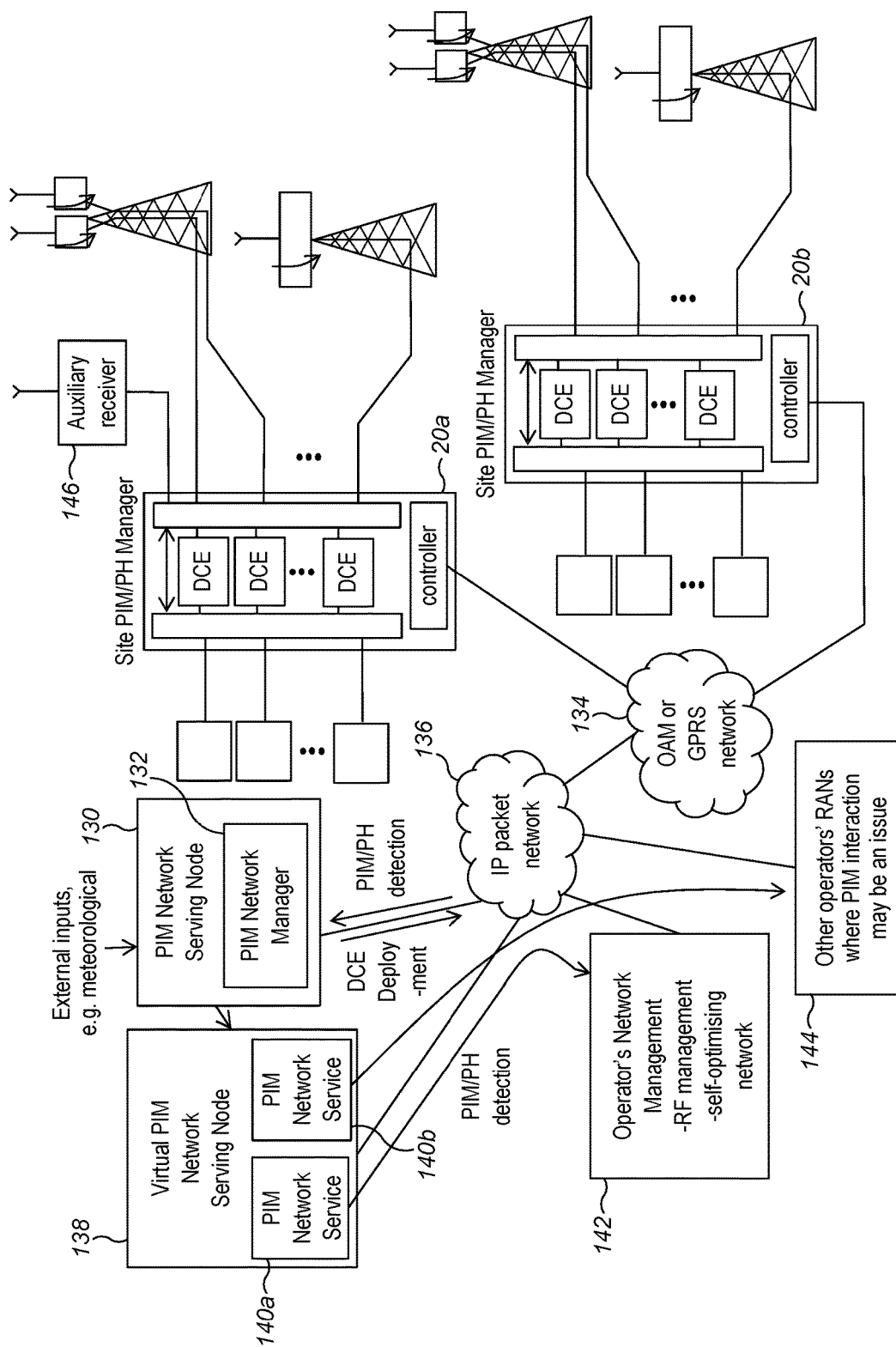
FIG. 9 is a schematic diagram showing a telecommunications network including a plurality of Site PIM/PH Managers in an embodiment.

FIG. 9 shows a telecommunications network including a plurality of Site PIM/PH Managers in an embodiment. An indication of PIM/PH detection may be provided from output ports of one or more Site PIM/PH Managers 20a, 20b to a PIM serving node 130, that may be part of a network management system. The PIM serving node may comprise a PIM Network Manager 132.

So, if interference is detected, a Site PIM/PH Manager may provide an indication that interference has been detected to a network management system. The network management system may be the network management system of a telecommunications system such as a wireless network. The indication may comprise information relating to an uplink carrier frequency experiencing interference and one or more downlink carrier frequency causing interference. The network management system may re-allocate downlink frequencies to avoid causing interference to uplink frequencies on the basis of the indication and/or may reduce transmission power of a downlink frequency to avoid causing interference to uplink frequencies on the basis of the indication.

A Site PIM/PH Manager (SPM), comprising detection/cancelling elements may be installed at a cell site or a so called Base Transceiver Station (BTS) "hotel", which may be remote from the site where the antennas are deployed. The SPM may intercept all of the CPRI/OBSAI optical links between the associated baseband processing units (BBUs) and radio heads. The control elements 120 of the system may either be co-located with the SPM or alternatively be partially or entirely hosted in a network control element of an Operation and Support System/Network Management System (OSS/NMS) system. The control element can collect detection information from a number of SPMs, i.e. from a number of DCEs in order to correlate results or seek correlation of Key Performance Indications (KPIs) with other radio access networks (RANs) in order to more effectively diagnose and solve problems within the network. The control element might also be part of an RF optimization system or self organizing network (SON) relating to the associated RAN(s).

A SPM may be arranged to manage the PIM or PH (passive harmonic) risks from either a subset of bands or carriers or all bands and carriers active on a cellular network cell site or cluster of sites connected to a BTS hotel. Improved PIM detection and management may be provided, for example by a network management system, on a network wide basis by correlating PIM detections with other indicative measures such as uplink KPIs and also environmental factors which are known to impact PIM behavior.

A management entity, such as a SPM controller, may determine which transmitted carrier combinations pose interference risks to which receive channels at each site or cluster of sites. It may deploy PIM/PH detectors to see if those risks are actually causing interference to receive channels at a given site, and may allocate PIM cancellers to remove the PIM/PH interference.

A management entity may receive reports from the DCE(s) on the PIM/PH risk, detection, and cancellation status and pass on relevant information to Self Organizing Network (SON) or RF optimization functions so that an enhanced network optimization solution may be found, potentially involving frequency and Tx power optimization.

A Site PIM/PH Manager (SPM) may be arranged to accesses all CRPI/OBSAI streams on an antenna tower, potentially enabling PIM management of all radiated carriers, including PIM cancellation between carriers and bands, PH (Passive Harmonic distortion) cancellation, and remote reporting to a tower owner or network manager on PIM/PH status. This may provide a high reliability design with redundancy features, for example reversion to pass-through mode in the event of failure, for example failure of a PSM.

Network wide PIM management may provide enhanced identification of common PIM problems across the network. A network manager may interact with a controller of a SPM through communication interfaces, for example, the OA&M network or an independent communication network such as a GPRS network. The network manager in combination with PSM controller may configure the system, including determining the allocation of detectors and cancellers to signals and radio receivers. By so doing, the network manager may reduce the number of detectors, cancellers and processors required in the network to achieve a given spatial and temporal response to changes in the monitored signals. The element manager may also monitor and report to the network manager the status of each of network elements, for example detectors, cancellers and processors, to determine for example any maintenance needed. Information from the various DCE nodes in the network may be collected together in a PIM Network Serving Node to provide a view of the behavior of the entire monitored network. This may be collocated with the network management node or may also host the network management function. A base station site may be shared by multiple wireless network operators. Consequently, the information gathered by the PIM Network Serving Node may relate to more than one operator. A Virtual PIM Network Serving Node may post process the data from the PIM Network Serving Node to present tailored or managed services to individual operators, without compromising information of other operators. This Virtual PIM Network Serving Node may also provide a point for network operators to contribute other data which may be of use in optimizing the performance of the PIM management network.

Figure 10:
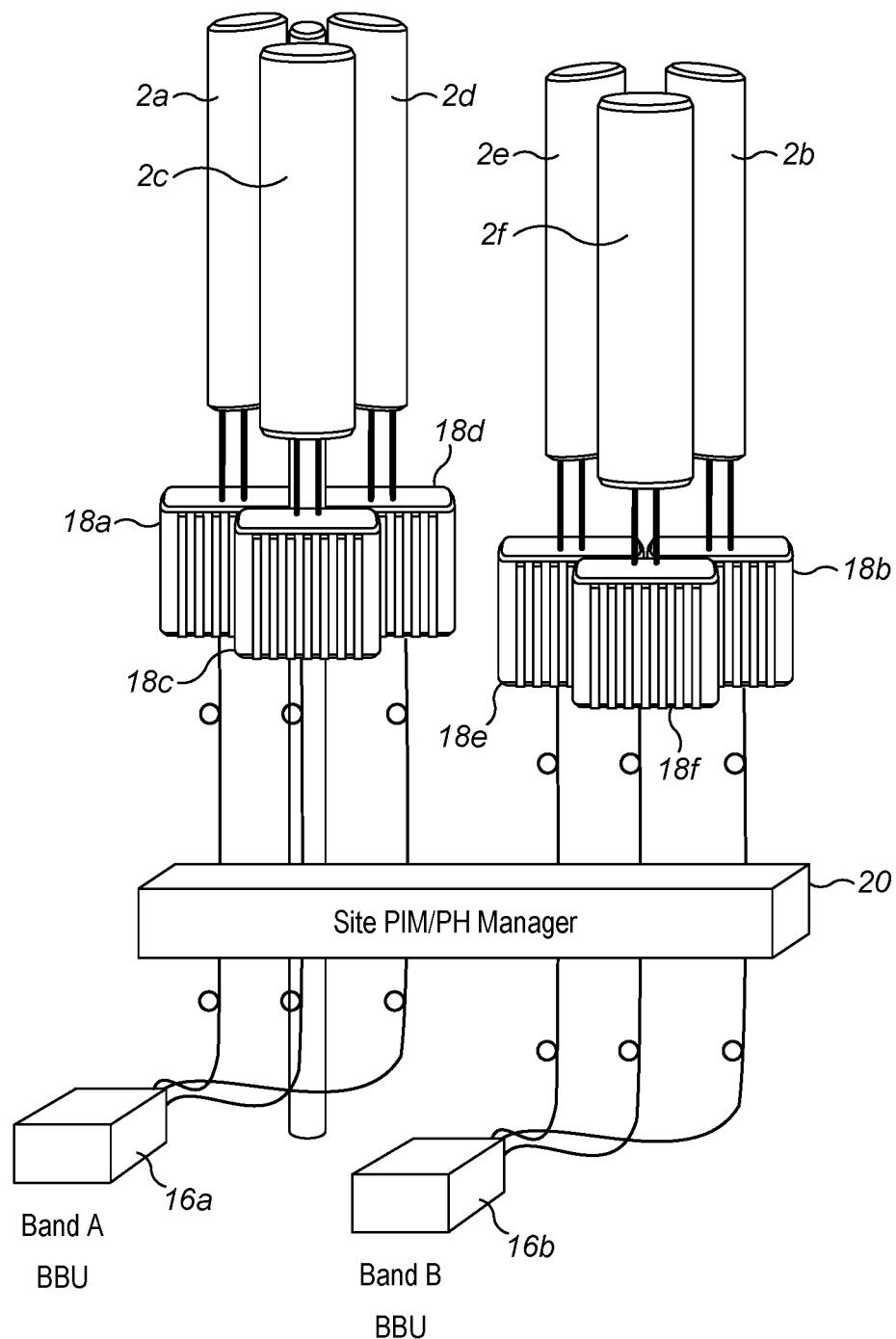
FIG. 10 illustrates a Site PIM/PH Manager connected to a plurality of CPRI links installed between a plurality of Base Band Units (BBUs) and a plurality of Remote Radio Heads (RRHs) in an embodiment.

FIG. 10 shows a Site PIM/PH Manager connected to a plurality of CPRI links installed between a plurality of Base Band Units (BBUs) and a plurality of Remote Radio Heads (RRHs) in an embodiment.

Figure 11:
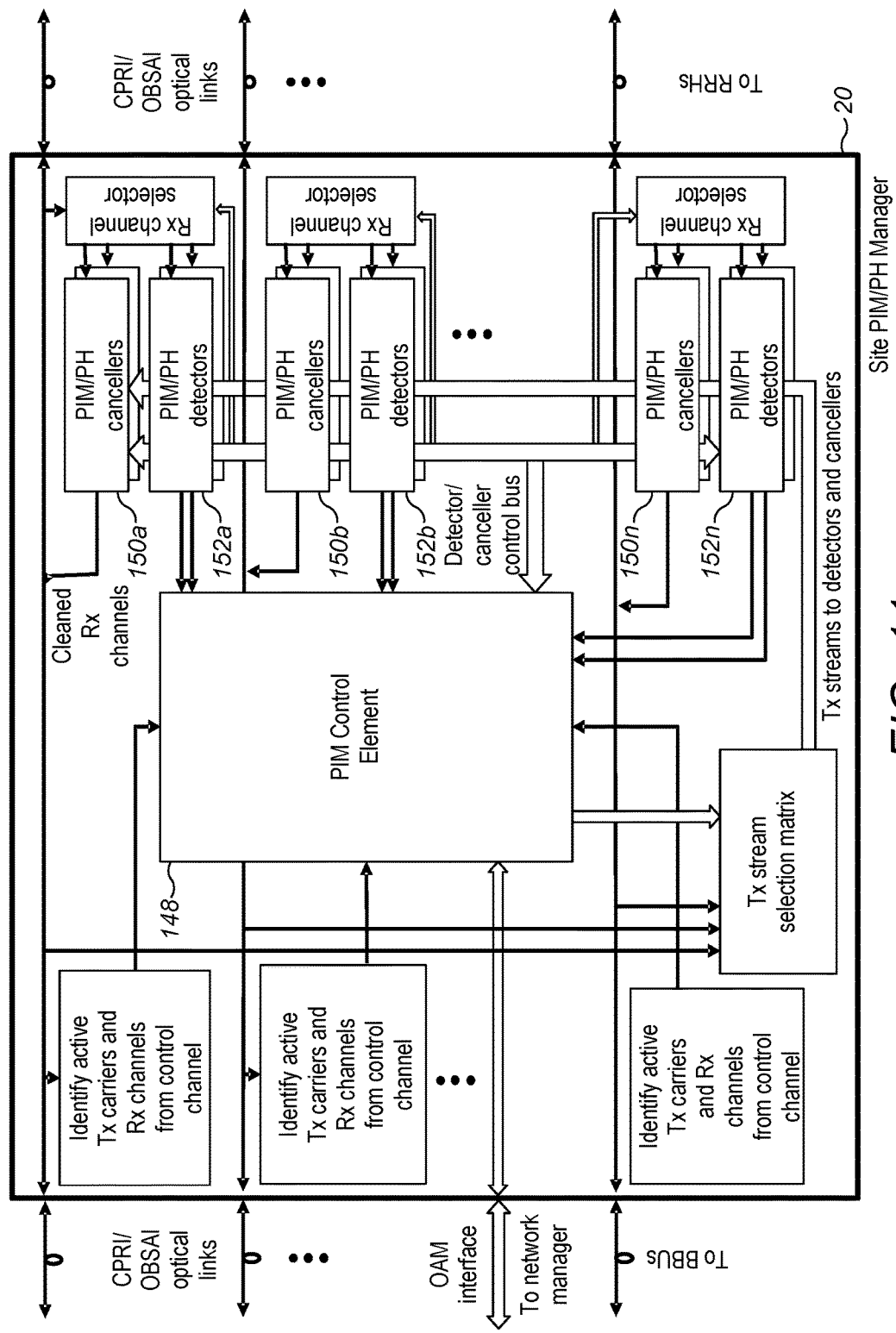
FIG. 11 is a schematic diagram illustrating a Site PIM/PH Manager in an embodiment.

FIG. 11 shows a Site PIM/PH Manager in an embodiment. The controller 148, 120 of the Site PIM/PH Manager may identify all of the transmit and receive frequencies and bandwidths in use at a cell site, for example by examining the CPRI/OBSAI control channels or data received via the OAM interface. From this information the controller may evaluate the combinations of transmit carriers and receive channels where an interference risk exists resulting from PIM/PH.

To determine if the interference risk combinations are actually causing interference the controller can deploy PIM/PH detectors 152a-152n appropriately initialized with the transmit/receive channel selection combinations; interference order and predicted interference frequency offset from the center of the receive channel, and may examine the detector outputs to determine a level of interference present for that risk scenario. If there is interference detected a PIM/PH canceller 150a-150n may be allocated by the controller to deal with the particular scenario detected.

The controller may also communicate the PIM/PH detection and cancellation status and performance to an external network management function. A detection metric may be available from the correlator in the PIM/PH detector together with a ranging estimate, which may be based on a determination of delay, to provide estimation of where the PIM/PH problem is located. This may be used to aid fault diagnosis when subsequent site maintenance is eventually scheduled. Cancellation Figures of merit may available from the PIM/PH canceller to indicate cancellation performance. These may be compared with a threshold to determine if the desired level of cancellation performance has been achieved. If the cancellation performance is unsatisfactory the function may be disabled and the canceller allocated to another task. An entity associated with the network manager may monitor the PIM/PH detection metric over time to maintain a watch on the PIM/PH detection levels and be used to correlate with other factors.

The controller may disable a canceller in response to a request from the network manager as a safeguard in the event the PIM/PH canceller has failed and degraded the receive performance.

In order to manage and optimize use of the available PIM/PH cancellers it may be advantageous to prioritize their use, for example allocation of the cancellers may be prioritized to those cases where the highest level of PIM/PH has been detected. Alternatively a prioritization may be received from the network management entity as to which receive carriers should be dealt with as a priority and hence allocated PIM/PH canceller resource.

To optimize PIM/PH canceller and detector utilization these functions may be pooled, enabling them to be flexibly deployed to operate on any receive channel on any radio interface and for any combination of Tx carriers. The pooling may for example be limited to groups for simplicity, each group associated with one CPRI/OBSAI interface.

Figure 12:
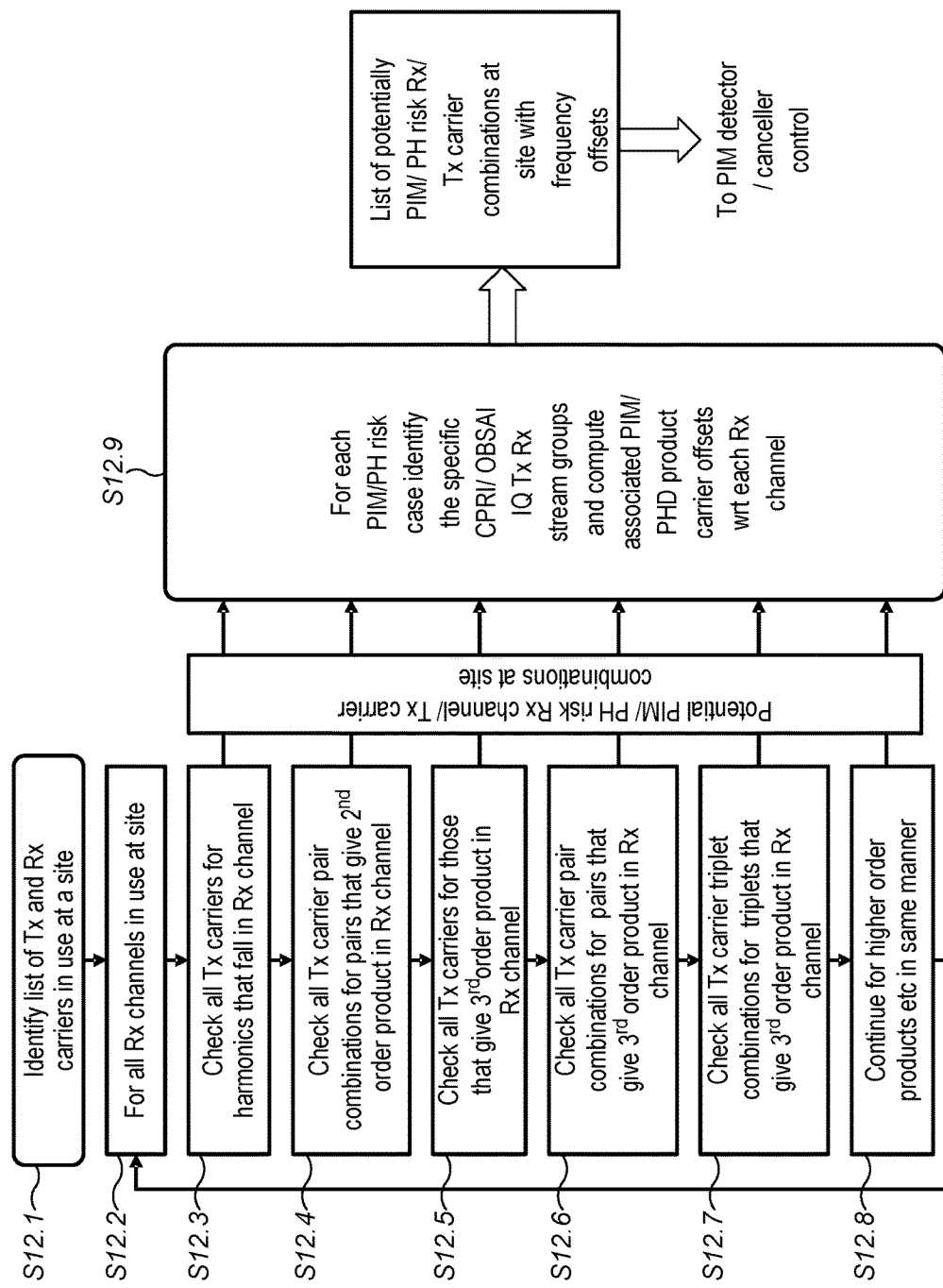
FIG. 12 is a flow chart illustrating a method of generating a list of potential combinations of transmitted carrier frequencies (downlink) and received carriers (uplink) for which the received carriers may be at risk of interference in an embodiment.

FIG. 12 is a flow chart illustrating a method of generating a list of potential combinations of transmitted carrier frequencies (downlink) and received carriers (uplink) for which the received carriers may be at risk of interference in an embodiment. As used in FIG. 12, the term "carrier" can either apply to an individual RF Tx carrier or to a block of carriers in use at a given band. A site may be an individual tower or cluster of co-located towers.

Figure 13:
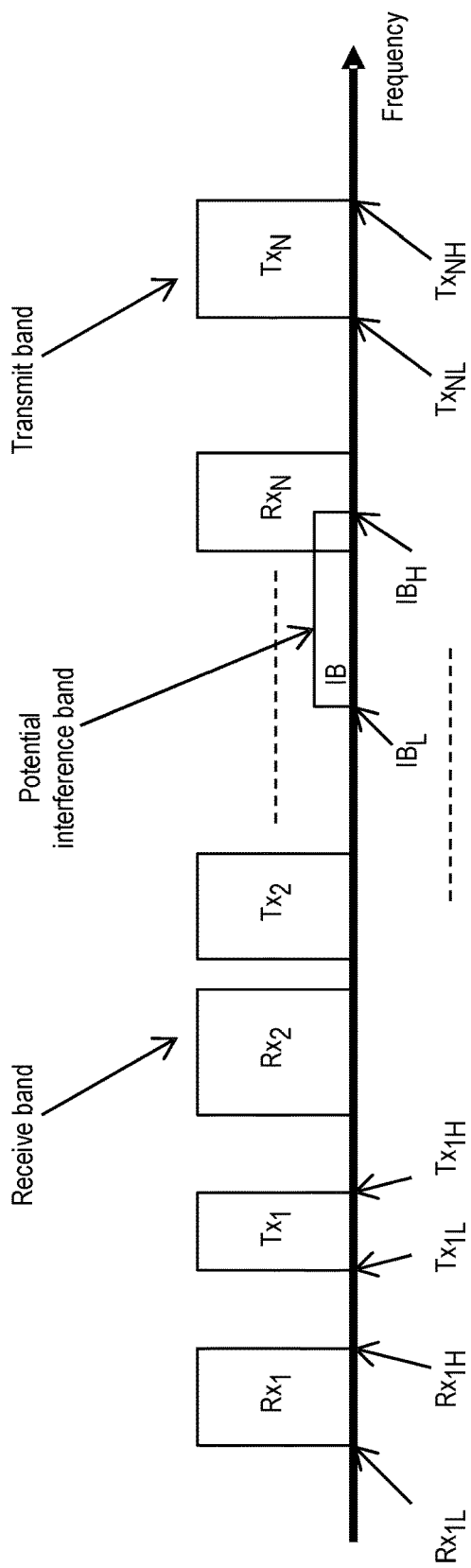
FIG. 13 is a schematic illustration of transmissions in the frequency domain within a wireless network illustrating a potential interference band and a received band at risk of interference.

FIG. 13 is a schematic illustration of transmissions in the frequency domain within a wireless network illustrating a potential interference band and a received band at risk of interference. This shows the spectrum usage at a particular base station including transmit and receive bands and a potential interference band resulting from PIM/PH.

Receive Channels which represent a single entity for a PIM processing function to operate on and could comprise either a single receive channel or a block of receive channels. Similarly the transmit bands will also be represented as Transmit Carriers which also represent a single entity for a PIM processing and could comprise either a single transmit carrier or a block of transmit carriers.

To identify interference risks, each receive (Rx) channel may be checked for overlap with the upper and lower bound of the PIM/PH interference band, $IB_L$ to $IB_H$. For example, for each Rx channel $Rx_i$ and for all potential interference bands $IB_j$ a potential problem may be flagged for the transmit (Tx) carriers generating the interference/Rx channel combination if the following test is false:

$Rx_{iL} > IB_{jH}$ AND $Rx_{iH} < IB_{jL}$ —Overlap test

As one example, a risk of $k^{th}$ harmonic interference on a particular receive channel may be made for each Tx carrier in turn by setting $IB_L = kTx_L$ and $IB_H = kTx_H$, then checking for overlap with the receive band by employing the overlap test defined above.

As a second example $2^{nd}$ order interference cases resulting from all pairs of Tx carriers m and n (n>m) may be made by using the overlap test for the two cases:

$IB_L = TX_{mL} + Tx_{nL}, IB_H = TX_{mH} + Tx_{nH}$ $IB_L = Tx_{nL} - Tx_{mH}, IB_H = Tx_{nH} - Tx_{mL}$

To test for $3^{rd}$ order interference resulting from single Tx carriers the overlap test is applied to the interference band defined by:

$IB_L = Tx_{mL} - (Tx_{mH} - Tx_{mL}), IB_H = Tx_{mH} + (Tx_{mH} - Tx_{mL})$

Further cases and higher $k^{th}$ exponent interference terms can be readily identified by inspection of an expansion of the equation:

$$(\cos(2\pi f_1) + \cos(2\pi f_2) + \ldots \cos(2\pi f_n))^k$$

Where $f_1 \ldots f_n$ represent the mid frequencies of n transmit carriers each of which have an associated bandwidth $BW_n$ The center frequency and bandwidth corresponding to the resulting terms in the expansion may be readily determined by examination. For example, in the case of two carriers at frequencies $f_1$ and $f_2$ and for k=5 one of the terms in the expansion is: $50/16 \cos(2\pi(2f_1 + f_2))$.

The center frequency of the corresponding interference term is given by $2f_1 + f_2$ and the resultant bandwidth $2BW_1 + BW_2$ $IB_L$ is therefore given by: $2f_1 + f_2 - (2BW_1 + BW_2)/2$ and $IB_H$ is therefore given by: $2f_1 + f_2 + (2BW_1 + BW_2)/2$ Once risk interference bands have been defined a table of risk combinations may be compiled for each risk case identifying transmit carrier(s) and receive channel combination, an order of interference terms, a frequency offset between the center of a receive channel and the center of a PIM/PH interference band. This information may be used to set up either a PIM/PH detector or a PIM/PH canceller.

Figure 14:
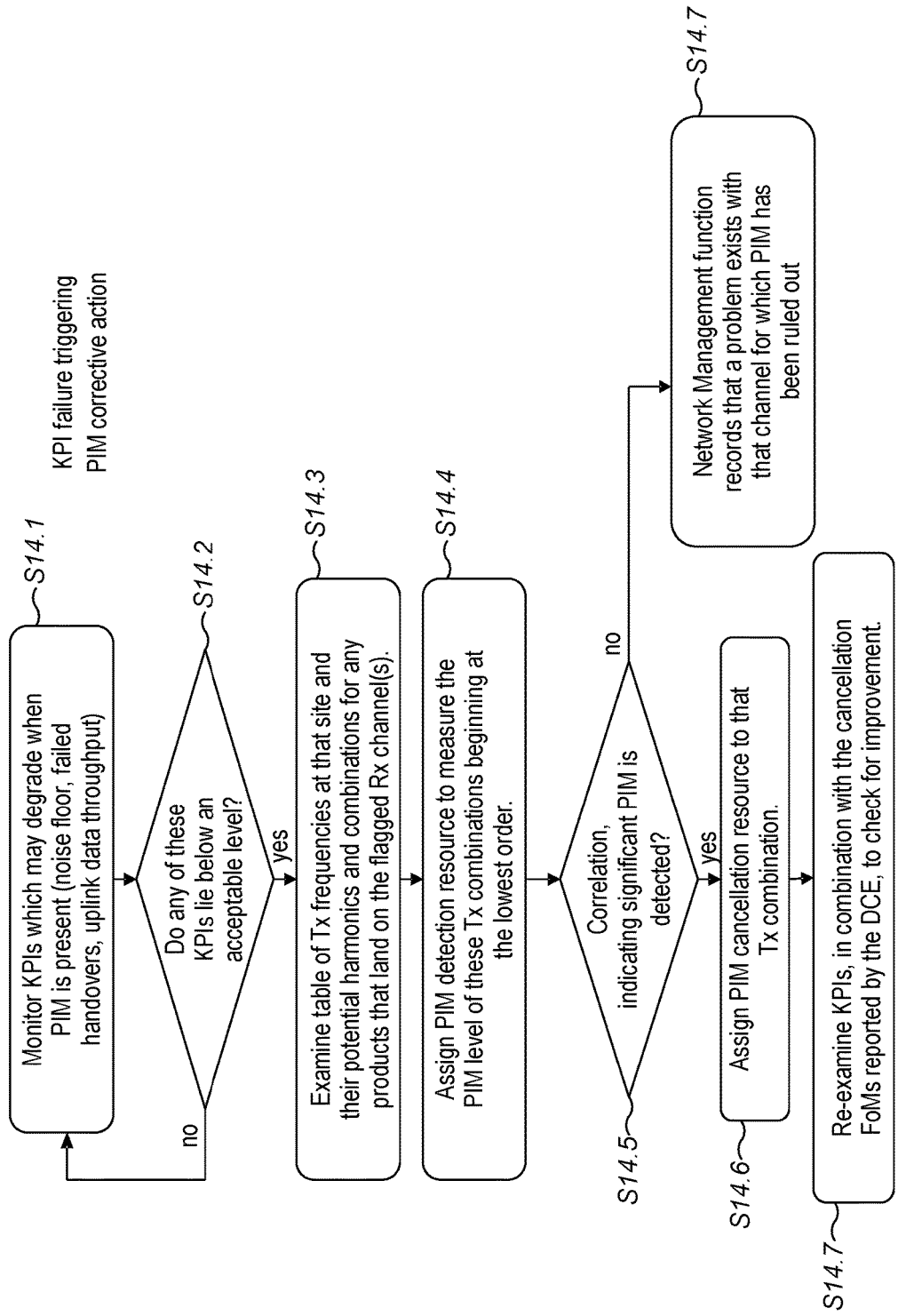
FIG. 14 is a flow diagram illustrating a process in which Key Performance Indicators of performance of a wireless network may be used to determine the allocation on PIM/PH detectors to uplink channels in an embodiment.

FIG. 14 is a flow diagram illustrating a process in which Key Performance Indicators of performance of a wireless network may be used to determine the allocation on PIM/PH detectors to uplink channels in an embodiment, by the steps shown.

KPIs (Key Performance Indicators) gathered at the Network Management function may be used to make decisions about the use of PIM detection and cancellation elements (DCE). KPIs that may flag the existence of a PIM issue include a rise in the noise floor of the receiver, a failed handover request both into and out of the affected sector, and a reduction in uplink data throughput, for example due to the raised noise floor. The handover request may be triggered by the quality of the downlink, which is not affected by PIM, consequently, when PIM is present, the UE can request a handover for which the uplink is not sufficiently robust.

Figure 15:
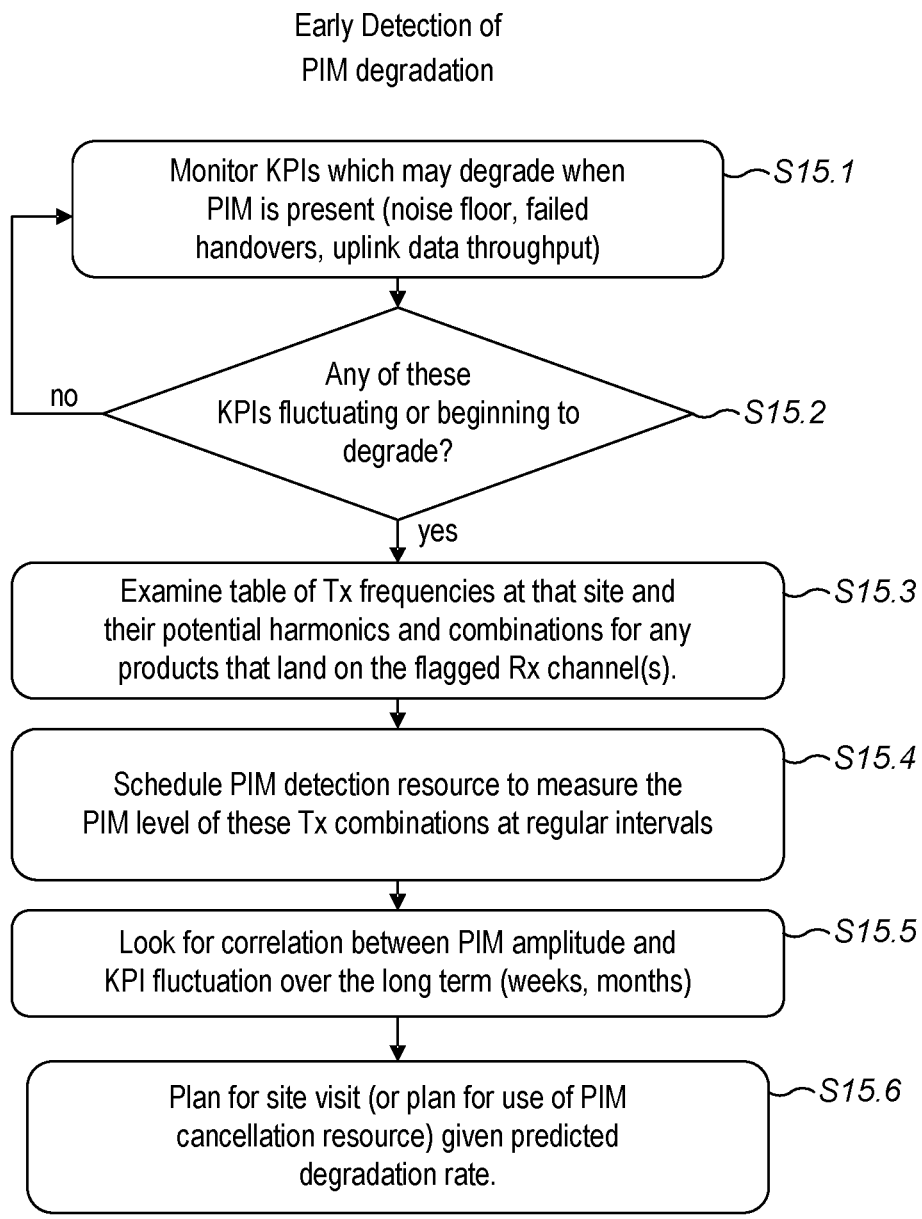
FIG. 15 is a flow diagram illustrating a process in which Key Performance Indicators of performance of a wireless network may be used in a network management system to model and predict interference from PIM/PH in an embodiment.

FIG. 15 is a flow diagram illustrating a process in which Key Performance Indicators of performance of a wireless network may be used in a network management system to model and predict interference from PIM/PH in an embodiment, for example by the steps shown.

Cell sites which passed PIM testing on installation can degrade with time due, for example to mechanical loosening of connectors, corrosion and water ingress. PIM detection may be used in combination with KPIs as an early detection system for degrading cell site equipment.

Figure 16:
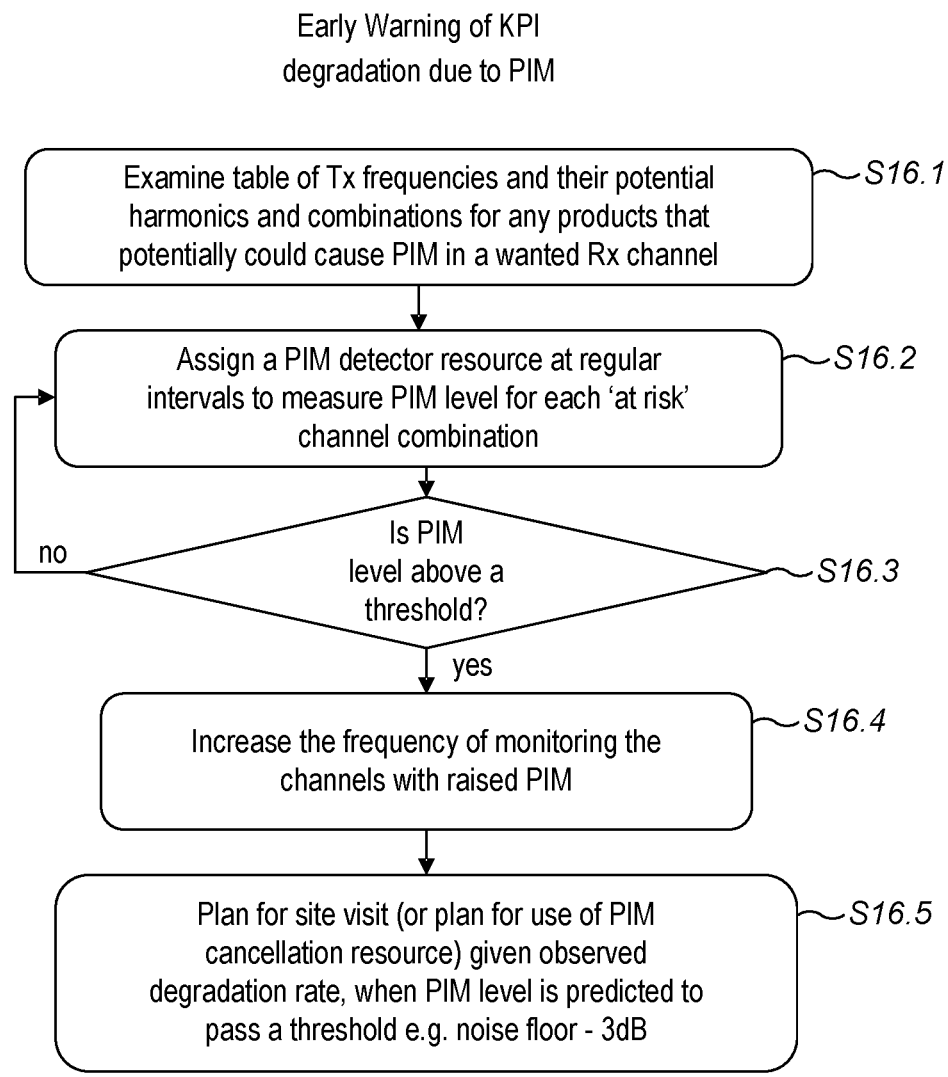
FIG. 16 is a flow diagram illustrating a process in which interference from PIM/PH may be monitored for at risk uplink channels in an embodiment.

FIG. 16 is a flow diagram illustrating a process in which interference from PIM/PH is monitored for at risk uplink channels in an embodiment by the steps shown. Alternatively, all the channels with a potential PIM risk can be scheduled for periodic PIM level measurement, even though they do not yet show significant KPI degradation. The PIM detection algorithm may well show measurable PIM before the KPIs show a measurable degradation. If the levels of PIM are increasing with time, intervention can be scheduled before KPIs begin to suffer significantly.

PIM/PH measurements may be used to help identify PIM sources, for example by regular monitoring of channel combinations with a potential PIM problem, the PIM detector can help identify the source of PIM. PIM power may be monitored over time to observe a pattern. For example, an increase in PIM over months or years may indicate corrosion. If PIM varies over hours and correlates with rain (PIM is often eased by rain), then the likely cause may be damage or corrosion of external joint. If PIM varies over hours and correlates with temperature (perhaps deduced from a diurnal pattern) then a likely cause may be expansion and contraction of joints. If PIM varies rapidly and there is a correlation with wind speed, which may suggests tower vibration, then cables or antenna may need to be held more rigidly, and may be likely to degrade with time as joint gets increasingly loose.

Relative PIM power may be measured in MIMO branches. If PIM power is more apparent on one branch than another, then a likely cause may be damage internal to equipment in that branch. If PIM power is similar between MIMO branches, then a likely cause is an external problem such as non-linear effects in the tower or fencing.

Relative power between bands may be measured in multi-band antennas for example if the frequency plan is such that PIM is a potential issue for more than one system. If PIM power is higher on one system (band) than another, then a likely cause may be damage to internal to equipment excluding the antenna. If PIM power is similar between all systems using the multi-band antenna, then a likely cause may be internal to the antenna or an external problem such as the tower, fencing, etc.

Calculating the delay to the PIM source is typically part of the operation of the PIM detector/canceller. The delay can be used to help identify where the PIM source lies. A short delay may indicate a problem prior to the duplexer, a longer delay a problem within or after the duplexer, a long delay a problem external to the antenna, perhaps on the tower.

Likely PIM sources may be identified by the relative contributions of $3^{rd}$, $5^{th}$, $7^{th}$ order PIM, and/or by a frequency dependence in the PIM measurements.

Figure 17:
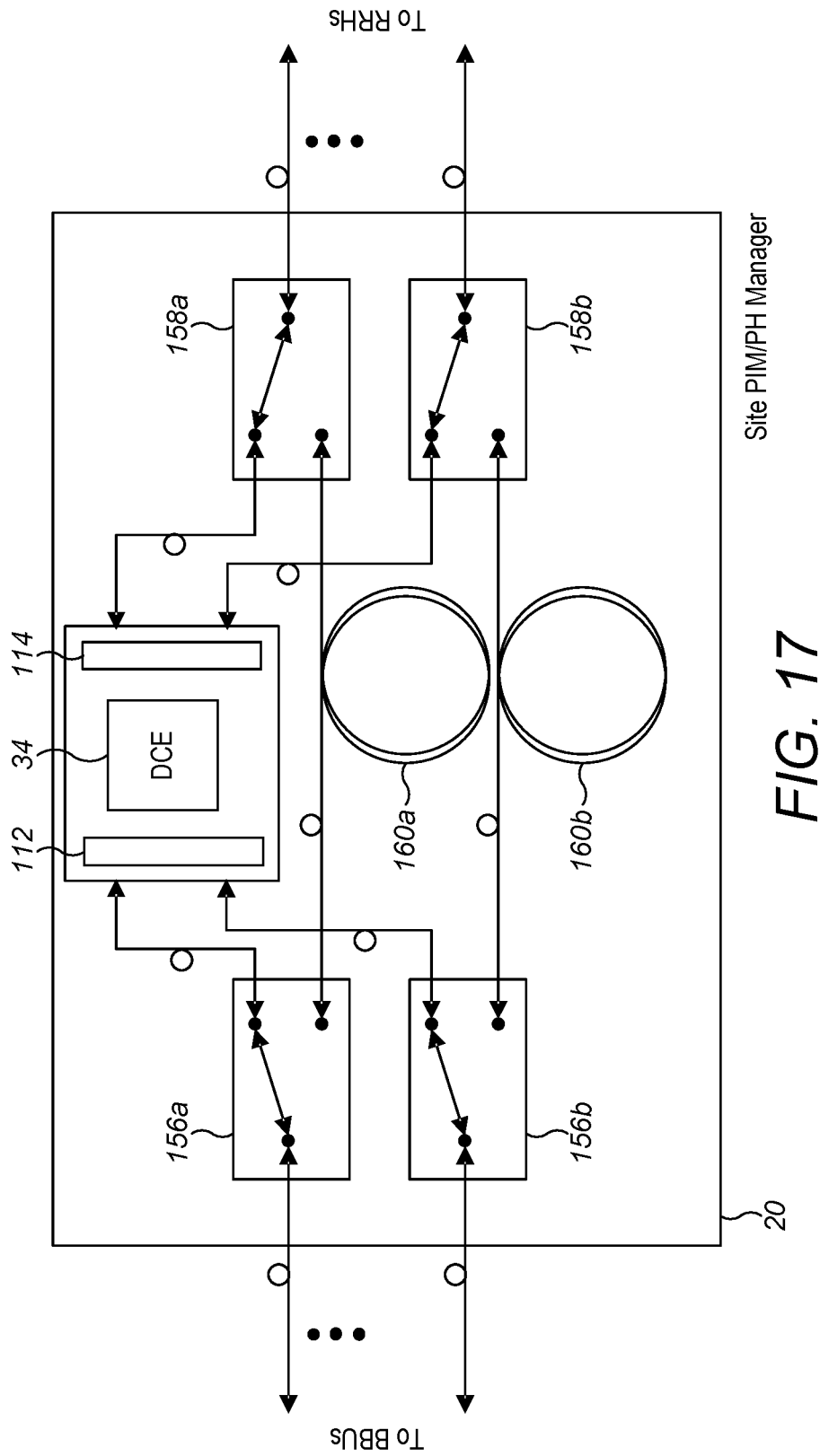
FIG. 17 is a schematic diagram illustrating a by-pass switch arrangement in an embodiment.

FIG. 17 shows a by-pass switch arrangement in an embodiment. This provides a fall back mode for use should a SPM fail. If the fiber link to the RRH already includes a dual redundant fiber then that fiber may be passed through the DCE unit as an optical signal to provide redundancy. Alternatively an optical relay bypass arrangement may be used as shown in FIG. 17. Optomechanical switches may be provided, and controlled to revert to pass through mode in event of, for example, power failure or DCE failure, for example detected by watchdog or periodic checking function.

Embodiments may comprise a processor which may comprise the detector/canceller element and a controller. The processor may have hardware and software elements, and may be implemented using for example a digital signal processor or an arrangement of digital signal processors, and/or programmable logic such as one or more field programmable gate array (FPGA).

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing interference received in a wireless network, the interference comprising a non-linear product of at least one downlink signal of the wireless network, the method comprising:
intercepting a plurality of optical links, each optical link being between a respective baseband processing unit of a plurality of baseband processing units and a respective radio head of a plurality of radio heads, to provide a plurality of downlink and uplink data streams;
detecting the interference in an uplink data stream of the plurality of uplink data streams, the uplink data stream representing signals received at a first uplink carrier frequency caused by non-linear products of at least a signal at a first downlink carrier frequency represented by a downlink data stream of the plurality of downlink data streams; and
generating an indication of an uplink carrier frequency experiencing the interference comprising a non-linear product of at least one downlink signal of the wireless network and an indication of at least one downlink carrier frequency causing the interference.

2. The method according of claim 1, wherein the non-linear products are passive intermodulation (PIM) products.

3. The method of claim 2, comprising measuring power of PIM products in the detected interference.

4. The method of claim 3, comprising measuring relative power of PIM products between MIMO branches of the uplink data stream.

5. The method of claim 4, comprising determining, if the relative power of PIM products on one branch is higher on one MIMO branch than another MIMO branch, that a likely cause of PIM is damage to equipment on the branch with the higher relative power of PIM products.

6. The method of claim 4, comprising determining, if the relative power of PIM products on one branch is similar between MIMO branches, that a likely cause of PIM is external to the MIMO branches.

7. The method of claim 3, comprising measuring relative power of PIM products between bands in a multi-band antenna system.

8. The method of claim 7, comprising determining, if the relative power of PIM products on one band is similar to that on another band, that a likely cause of PIM is internal to an antenna or in an external environment.

9. The method of claim 2, comprising calculating the delay to a source of PIM.

10. The method of claim 9, comprising using the calculated delay to identify the position of a source of PIM.

11. An apparatus for processing interference received in a wireless network, the interference comprising a non-linear product of at least one downlink signal of the wireless network, the apparatus comprising:
an interface configured to intercept a plurality of optical links, each optical link being between a respective baseband processing unit of a plurality of baseband processing units and a respective radio head of a plurality of radio heads, to provide a plurality of downlink and uplink data streams;

a detector element comprising a correlator configured to detect the interference in an uplink data stream of the plurality of uplink data streams, the uplink data stream representing signals received at a first uplink carrier frequency caused by non-linear products of at least a signal at a first downlink carrier frequency represented by a downlink data stream of the plurality of downlink data streams; and a controller configured to generate an indication of an uplink carrier frequency experiencing the interference comprising a non-linear product of at least one downlink signal of the wireless network and an indication of at least one downlink carrier frequency causing the interference.

12. The apparatus of claim 11, wherein the apparatus is arranged to intercept a plurality of CPRI optical links between associated base band processing units and radio heads at a cell site.

13. The apparatus of claim 11, wherein the apparatus is installed at a cell site.

14. The apparatus of claim 11, wherein the apparatus is installed at a base transceiver system hotel remote from a site where antennas are deployed.

15. The apparatus of claim 11, wherein the apparatus comprises a control element hosted in a network control element of an Operation and Support System/Network Management System (OSS/NMS) system.

16. The apparatus of claim 15, wherein the control element is configured to collect detection information from another apparatus for processing interference in the wireless network.

17. The apparatus of claim 16, wherein the control element is configured to diagnose and solve problems within the wireless network.

18. The apparatus of claim 17, wherein the control element is configured to correlate Key Performance Indications (KPIs) with other radio access networks (RANs).

19. The apparatus of claim 18, wherein the control element is part of a self organizing network (SON).

20. The apparatus of claim 11, wherein the apparatus is configured to provide an indication that interference has been detected to a network management system.

* * * * *